US012256310B2

United States Patent
Zhang

(10) Patent No.: US 12,256,310 B2
(45) Date of Patent: Mar. 18, 2025

(54) RELAY DEVICE SELECTION METHOD AND DEVICE, AND COMPUTER STORAGE MEDIUM

(71) Applicant: DATANG MOBILE COMMUNICATIONS EQUIPMENT CO., LTD., Beijing (CN)

(72) Inventor: Huiying Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 363 days.

(21) Appl. No.: 17/790,507

(22) PCT Filed: Dec. 21, 2020

(86) PCT No.: PCT/CN2020/138012
§ 371 (c)(1),
(2) Date: Jul. 1, 2022

(87) PCT Pub. No.: WO2021/143464
PCT Pub. Date: Jul. 22, 2021

(65) Prior Publication Data
US 2023/0045829 A1    Feb. 16, 2023

(30) Foreign Application Priority Data
Jan. 15, 2020  (CN) .......................... 202010043440.0

(51) Int. Cl.
H04W 40/22 (2009.01)
H04W 40/12 (2009.01)
H04W 88/04 (2009.01)

(52) U.S. Cl.
CPC ........... *H04W 40/22* (2013.01); *H04W 40/12* (2013.01); *H04W 88/04* (2013.01)

(58) Field of Classification Search
CPC ...... H04W 40/22; H04W 40/12; H04W 88/04
(Continued)

(56) References Cited

U.S. PATENT DOCUMENTS

| | | | |
|---|---|---|---|
| 2008/0232334 | A1 | 9/2008 | Das et al. |
| 2016/0128116 | A1* | 5/2016 | Kim ...................... H04W 4/021 370/329 |

(Continued)

FOREIGN PATENT DOCUMENTS

| | | |
|---|---|---|
| CN | 104113936 A | 10/2014 |
| CN | 105228082 A | 1/2016 |

(Continued)

OTHER PUBLICATIONS

Sony, "Discussion on UE-to-Network Relay measurement", 3GPP TSG RAN WG1 Meeting #81, Fukuoka, Japan, May 25-29, 2015, total 4 pages, R1-153087.

*Primary Examiner* — Mark G. Pannell
(74) *Attorney, Agent, or Firm* — Kilpatrick Townsend & Stockton LLP

(57) ABSTRACT

The present application relates to the field of wireless communications, and in particular to a relay device selection method and device, and a computer storage medium, which are used for selecting a relay device for a remote device. In the embodiments of the present application, a remote device determines channel quality information of a first sidelink between the remote device and at least one candidate relay device and channel quality information of a second sidelink therebetween, and selects a relay device to be used from among the at least one candidate relay device according to the channel quality information of the first sidelink corresponding to the candidate relay device and the channel quality information of the second sidelink corresponding thereto.

16 Claims, 7 Drawing Sheets

(58) Field of Classification Search
USPC .......................................................... 370/315
See application file for complete search history.

(56) References Cited

U.S. PATENT DOCUMENTS

| | | | | |
|---|---|---|---|---|
| 2016/0286374 | A1* | 9/2016 | Baghel | H04W 24/10 |
| 2016/0337935 | A1* | 11/2016 | Patil | H04W 72/27 |
| 2016/0337954 | A1* | 11/2016 | Gulati | H04W 48/17 |
| 2017/0055282 | A1* | 2/2017 | Sadiq | H04W 74/08 |
| 2017/0086114 | A1* | 3/2017 | Jung | H04W 52/383 |
| 2017/0126306 | A1* | 5/2017 | Kim | H04W 72/044 |
| 2017/0163470 | A1* | 6/2017 | Seo | H04W 4/70 |
| 2017/0317740 | A1* | 11/2017 | Basu Mallick | H04W 88/04 |
| 2017/0359116 | A1* | 12/2017 | Hwang | H04W 40/22 |
| 2017/0366958 | A1* | 12/2017 | Ryu | H04W 88/04 |
| 2018/0063768 | A1* | 3/2018 | Martin | H04W 36/302 |
| 2018/0063839 | A1* | 3/2018 | Jung | H04L 27/261 |
| 2018/0069664 | A1* | 3/2018 | Khoryaev | H04L 1/1621 |
| 2018/0076878 | A1* | 3/2018 | Ryu | H04W 64/006 |
| 2018/0077618 | A1* | 3/2018 | Lee | H04W 76/40 |
| 2018/0084442 | A1* | 3/2018 | Lee | H04W 76/27 |
| 2018/0139640 | A1* | 5/2018 | Chae | H04L 25/0204 |
| 2018/0139694 | A1* | 5/2018 | Folke | H04W 76/14 |
| 2018/0176805 | A1* | 6/2018 | Lee | H04W 76/14 |
| 2018/0206176 | A1* | 7/2018 | Panteleev | H04W 28/04 |
| 2018/0255505 | A1* | 9/2018 | Thyagarajan | H04J 11/0069 |
| 2018/0262282 | A1* | 9/2018 | Yang | H04L 1/20 |
| 2018/0332652 | A1* | 11/2018 | Kim | H04W 76/30 |
| 2019/0036595 | A1* | 1/2019 | Ohtsuji | H04W 76/14 |
| 2020/0008127 | A1 | 1/2020 | Ohtsuji | |
| 2020/0267025 | A1* | 8/2020 | Yu | H04L 5/0051 |
| 2022/0386333 | A1* | 12/2022 | Mochizuki | H04W 72/20 |

FOREIGN PATENT DOCUMENTS

| | | |
|---|---|---|
| CN | 105430633 A | 3/2016 |
| CN | 106304258 A | 1/2017 |
| CN | 106576390 A | 4/2017 |
| CN | 106888494 A | 6/2017 |
| CN | 108541389 A | 9/2018 |
| CN | 110461020 A | 11/2019 |
| EP | 3185612 A1 | 6/2017 |
| EP | 3297328 A1 | 3/2018 |
| WO | 9911081 A2 | 3/1999 |
| WO | 2016185285 A1 | 11/2016 |

\* cited by examiner

RELAY DEVICE SELECTION METHOD AND DEVICE, AND COMPUTER STORAGE MEDIUM

CROSS-REFERENCE OF RELATED APPLICATIONS

The present application is a National Stage of International Application No. PCT/CN2020/138012, filed Dec. 21, 2020, which claims the priority from Chinese Patent Application No. 202010043440.0, filed with the Chinese Patent Office on Jan. 15, 2020 and entitled "Relay Device Selection Method and Device, and Computer Storage Medium", both of which are hereby incorporated by reference in their entireties.

FIELD OF DISCLOSURE

The present application relates to the field of wireless communication technologies, and in particular, to a relay device selection method and device, and a computer storage medium.

BACKGROUND

The direct communication between devices is allowed between devices close to each other. The Device-to-Device (D2D) is a direct communication mechanism between devices. In order to expand the coverage of network services, the 3rd Generation Partnership Project (3GPP) introduces the UE-to-Network Relay based on layer 3 in the Rel-13.

In the D2D transmission, the reliability of a base station to provide services to edge user equipments within its coverage and user equipments outside its coverage is quite poor. A method is to select a relay device for a remote device at the edge of the coverage of the base station or outside the coverage. The relay technology can reduce the system power consumption, improve the reliability of the D2D transmission, reduce the communication burden of the base station, increase the coverage of the D2D communication, and thus enable users to obtain more stable services. However, how to select a relay device for a remote device has become an urgent problem to be solved.

BRIEF SUMMARY

The present application relates to the field of wireless communication technologies, and in particular, to a relay device selection method and device, and a computer storage medium, and to select a relay device for a remote device.

Based on the above problem, in one embodiment of the present application provides a relay device selection method, including:

determining, by a remote device, channel quality information of a first sidelink and channel quality information of a second sidelink between the remote device and at least one candidate relay device; where the first sidelink is a sidelink for the candidate relay device to send information to the remote device, and the second sidelink is a sidelink for the candidate relay device to receive information from the remote device;

selecting, by the remote device, a relay device to be used from the at least one candidate relay device according to the channel quality information of the first sidelink and the channel quality information of the second sidelink corresponding to the candidate relay device.

In one embodiment, the determining, by the remote device, the channel quality information of the first sidelink between the remote device and at least one candidate relay device in a following manner:

for any candidate relay device: determining, by the remote device, the channel quality information of the first sidelink according to a first measured signal sent by the candidate relay device.

In one embodiment, the determining, by the remote device, the channel quality information of the second sidelink between the remote device and at least one candidate relay device in a following manner:

for any candidate relay device: sending, by the remote device, a second measured signal to the candidate relay device, and the candidate relay device determines the channel quality information of the second sidelink according to the second measured signal;

receiving, by the remote device, the channel quality information of the second sidelink determined according to the second measured signal and returned by the candidate relay device.

In one embodiment, the selecting, by the remote device, the relay device to be used from the at least one candidate relay device according to the channel quality information of the first sidelink and the channel quality information of the second sidelink corresponding to the candidate relay device, includes:

for any candidate relay device: comparing a parameter included in the channel quality information of the first sidelink and a parameter included in the channel quality information of the second sidelink corresponding to the candidate relay device with thresholds corresponding to parameters, to determine whether the candidate relay device is an alternative relay device;

selecting the relay device to be used from determined alternative relay devices.

In one embodiment, the selecting the relay device to be used from the determined candidate relay devices, includes:

selecting the relay device to be used from at least two alternative relay devices according to parameters included in channel quality information of first sidelinks and parameters included in channel quality information of second sidelinks corresponding to the alternative relay devices in response to the at least two alternative relay devices being determined.

In one embodiment, before the determining, by the remote device, the channel quality information of the first sidelink and the channel quality information of the second sidelink between the remote device and at least one candidate relay device, the method further includes:

determining, by the remote device, to reselect a relay device to be used according to channel quality information of a third sidelink and channel quality information of a fourth sidelink between the remote device and a currently used relay device;

where the third sidelink is a sidelink for the currently used relay device to send information to the remote device, and the fourth sidelink is a sidelink for the currently used relay device to receive information from the remote device.

In one embodiment, the determining, by the remote device, the channel quality information of the third sidelink between the remote device and the currently used relay device in a following manner:

determining, by the remote device, the channel quality information of the third sidelink according to a third measured signal sent by the currently used relay device.

In one embodiment, the determining, by the remote device, the channel quality information of the fourth sidelink between the remote device and the currently used relay device in a following manner:

sending, by the remote device, a fourth measured signal to the currently used relay device, and the currently used relay device determines the channel quality information of the fourth sidelink according to the fourth measured signal;

receiving, by the remote device, the channel quality information of the fourth sidelink determined according to the fourth measured signal and returned by the currently used relay device.

In one embodiment, the determining, by the remote device, to reselect the relay device to be used according to the channel quality information of the third sidelink and the channel quality information of the fourth sidelink between the remote device and the currently used relay device, includes:

comparing, by the remote device, a parameter included in the channel quality information of the third sidelink and a parameter included in the channel quality information of the fourth sidelink corresponding to the currently used relay device with thresholds corresponding to parameters, and determining that the relay device to be used needs to be reselected according to a comparison result.

In one embodiment, before the determining, by the remote device, the channel quality information of the first sidelink and the channel quality information of the second sidelink between the remote device and at least one candidate relay device, the method further includes:

determining, by the remote device, that a relay device to be used needs to be reselected after receiving indication information sent by a currently used relay device;

where the indication information is sent by the currently used relay device after determining that the remote device needs to reselect the relay device to be used.

In one embodiment, the thresholds corresponding to the parameters are pre-configured or configured by a network-side device for the remote device.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

In one embodiment of the present application provides a relay device selection method, including:

sending, by a candidate relay device, a first measured signal to a remote device, and the remote device determines channel quality information of a first sidelink between the remote device and the candidate relay device according to the first measured signal; and determining, by the candidate relay device, channel quality information of a second sidelink between the candidate relay device and the remote device according to a second measured signal sent by the remote device, and sending the channel quality information of the second sidelink to the remote device, and the remote device selects a relay device to be used according to the channel quality information of the first sidelink and the channel quality information of the second sidelink corresponding to the candidate relay device;

where the first sidelink is a sidelink for the candidate relay device to send information to the remote device, and the second sidelink is a sidelink for the candidate relay device to receive information from the remote device.

In one embodiment, the channel quality information includes some or all of:

channel state information, channel quality indicator, rand indication, signal to interference plus noise ratio, reference signal receiving power, reference signal receiving quality, received signal strength indication, block error rate; bit error rate; hybrid automatic repeat request information.

In one embodiment of the present application provides a relay device selection method, including:

determining, by a relay device, auxiliary information for assisting a remote device to determine whether to reselect a relay device to be used;

sending, by the relay device, the auxiliary information to the remote device, and the remote device determines that the relay device to be used needs to be reselected according to the auxiliary information and selects the relay device to be used according to channel quality information of a first sidelink and channel quality information of a second sidelink between the remote device and at least one candidate relay device;

where the first sidelink is a sidelink for the candidate relay device to send information to the remote device, and the second sidelink is a sidelink for the candidate relay device to receive information from the remote device.

In one embodiment, the auxiliary information includes a third measured signal and channel quality information of a fourth sidelink;

the sending, by the relay device, the auxiliary information to the remote device, includes:

sending, by the relay device, the third measured signal to the remote device, and determining, the relay device, the channel quality information of the fourth sidelink according to a fourth measured signal sent by the remote device, and sending the channel quality information of the fourth sidelink to the remote device, and the remote device determines channel quality information of a third sidelink according to the third measured signal and determines that the relay device to be used needs to be reselected according to the channel quality information of the third sidelink and the channel quality information of the fourth sidelink;

where the third sidelink is a sidelink for the relay device to send information to the remote device, and the fourth sidelink is a sidelink for the relay device to receive information from the remote device.

In one embodiment, the auxiliary information is indication information for indicating that the relay device to be used needs to be reselected;

the determining, by the relay device, the auxiliary information for assisting the remote device to determine whether to reselect the relay device to be used, includes:

generating, by the relay device, the indication information for indicating that the relay device to be used needs to be reselected according to channel quality information of a third sidelink and channel quality information of a fourth sidelink between the relay device and the remote device; where the third sidelink is a sidelink for the relay device to send information to the remote device, and the fourth sidelink is a sidelink for the relay device to receive information from the remote device; or generating, by the relay device, the indication information according to quality of a cellular communication link between the relay device and a network side device; or generating, by the relay device, the indication information for indicating that the relay device to be used needs to be reselected according to a working state of the relay device.

In one embodiment, the relay device determines the channel quality information of the third sidelink in a following manner:

sending, by the relay device, a third measured signal to the remote device, and the remote device determines the channel quality information of the third sidelink according to the third measured signal;

receiving, by the relay device, the channel quality information of the third sidelink determined according to the third measured signal and returned by the remote device.

In one embodiment, the relay device determines the channel quality information of the fourth sidelink in a following manner:

determining, by the relay device, the channel quality information of the fourth sidelink according to a fourth measured signal sent by the remote device.

In one embodiment, the generating, by the relay device, the indication information for indicating that the relay device to be used needs to be reselected according to the channel quality information of the third sidelink and the channel quality information of the fourth sidelink between the relay device and the remote device, includes:

comparing, by the relay device, a parameter included in the channel quality information of the third sidelink and a parameter included in the channel quality information of the fourth sidelink with thresholds corresponding to parameters, and generating the indication information according to a comparison result.

In one embodiment, the channel quality information includes some or all of:

channel state information, channel quality indicator, rand indication, signal to interference plus noise ratio, reference signal receiving power, reference signal receiving quality, received signal strength indication, block error rate; bit error rate; hybrid automatic repeat request information.

In one embodiment of the present application provides a remote device, including a processor, a memory and a transceiver;

where the processor is configured to read programs in the memory to:

determine channel quality information of a first sidelink and channel quality information of a second sidelink between the remote device and at least one candidate relay device; where the first sidelink is a sidelink for the candidate relay device to send information to the remote device, and the second sidelink is a sidelink for the candidate relay device to receive information from the remote device;

select a relay device to be used from the at least one candidate relay device according to the channel quality information of the first sidelink and the channel quality information of the second sidelink corresponding to the candidate relay device.

In one embodiment of the present application provides a candidate relay device, including a processor, a memory and a transceiver;

where the processor is configured to read programs in the memory to:

send a first measured signal to a remote device via the transceiver, and the remote device determines channel quality information of a first sidelink between the remote device and a candidate relay device according to the first measured signal; and determine channel quality information of a second sidelink between the candidate relay device and the remote device according to a second measured signal sent by the remote device, and send the channel quality information of the second sidelink to the remote device via the transceiver, and the remote device selects a relay device to be used according to the channel quality information of the first sidelink and the channel quality information of the second sidelink corresponding to the candidate relay device;

where the first sidelink is a sidelink for the candidate relay device to send information to the remote device, and the second sidelink is a sidelink for the candidate relay device to receive information from the remote device.

In one embodiment of the present application provides a relay device, including a processor, a memory and a transceiver;

where the processor is configured to read programs in the memory to:

determine auxiliary information for assisting a remote device to determine whether to reselect a relay device to be used;

send the auxiliary information to the remote device via the transceiver, and the remote device determines that the relay device to be used needs to be reselected according to the auxiliary information and selects the relay device to be used according to channel quality information of a first sidelink and channel quality information of a second sidelink between the remote device and at least one candidate relay device;

where the first sidelink is a sidelink for the candidate relay device to send information to the remote device, and the second sidelink is a sidelink for the candidate relay device to receive information from the remote device.

In one embodiment of the present application provides a remote device, including:

a first determining device configured to determine channel quality information of a first sidelink and channel quality information of a second sidelink between the remote device and at least one candidate relay device; where the first sidelink is a sidelink for the candidate relay device to send information to the remote device, and the second sidelink is a sidelink for the candidate relay device to receive information from the remote device;

a selection device configured to select a relay device to be used from the at least one candidate relay device according to the channel quality information of the first sidelink and the channel quality information of the second sidelink corresponding to the candidate relay device.

In one embodiment of the present application provides a candidate relay device, including:

a sending device configured to send a first measured signal to a remote device, and the remote device determines channel quality information of a first sidelink between the remote device and the candidate relay device according to the first measured signal; and a measurement device configured to determine channel quality information of a second sidelink between the candidate relay device and the remote device according to a second measured signal sent by the remote device, and send the channel quality information of the second sidelink to the remote device, and the remote device selects a relay device to be used according to the channel quality information of the first sidelink and the channel quality information of the second sidelink corresponding to the candidate relay device;

where the first sidelink is a sidelink for the candidate relay device to send information to the remote device, and the second sidelink is a sidelink for the candidate relay device to receive information from the remote device.

In one embodiment of the present application provides a relay device, including:

a second determining device configured to determine auxiliary information for assisting a remote device to determine whether to reselect a relay device to be used;

a reselection device configured to send the auxiliary information to the remote device, and the remote device determines that the relay device to be used needs to be reselected according to the auxiliary information and selects the relay device to be used according to channel quality information of a first sidelink and channel quality information of a second sidelink between the remote device and at least one candidate relay device;

where the first sidelink is a sidelink for the candidate relay device to send information to the remote device, and the second sidelink is a sidelink for the candidate relay device to receive information from the remote device.

In one embodiment of the present application provides a computer storable medium storing a computer program thereon, where the program, when executed by a processor, implements the steps of the method described in the above embodiments, or implements the steps of the method described in the above embodiments, or implements the steps of the method described in the above embodiments.

In the relay device selection methods provided by embodiments of the present application, the remote device determines the channel quality information of the first sidelink and the channel quality information of the second sidelink between the remote device and at least one candidate relay device, and then selects a relay device to be used from the at least one candidate relay device according to the channel quality information of the first sidelink and the channel quality information of the second sidelink corresponding to the candidate relay device. As can be seen from the above, when selecting a relay device, the remote device selects the relay device according to the channel quality information of the bidirectional sidelink between the remote device and the candidate relay device. In the embodiments of the present application, when selecting a relay device, the channel quality information of the first sidelink for the candidate relay device to send information to the remote device and the channel quality information of the second sidelink for the remote device to send information to the candidate relay device are both used as the reference information for selecting the relay device, and the relay device is selected according to the channel quality information of the bidirectional sidelink, improving the reliability of the selected relay device.

DETAILED DESCRIPTION OF THE EMBODIMENTS

Figure 1:
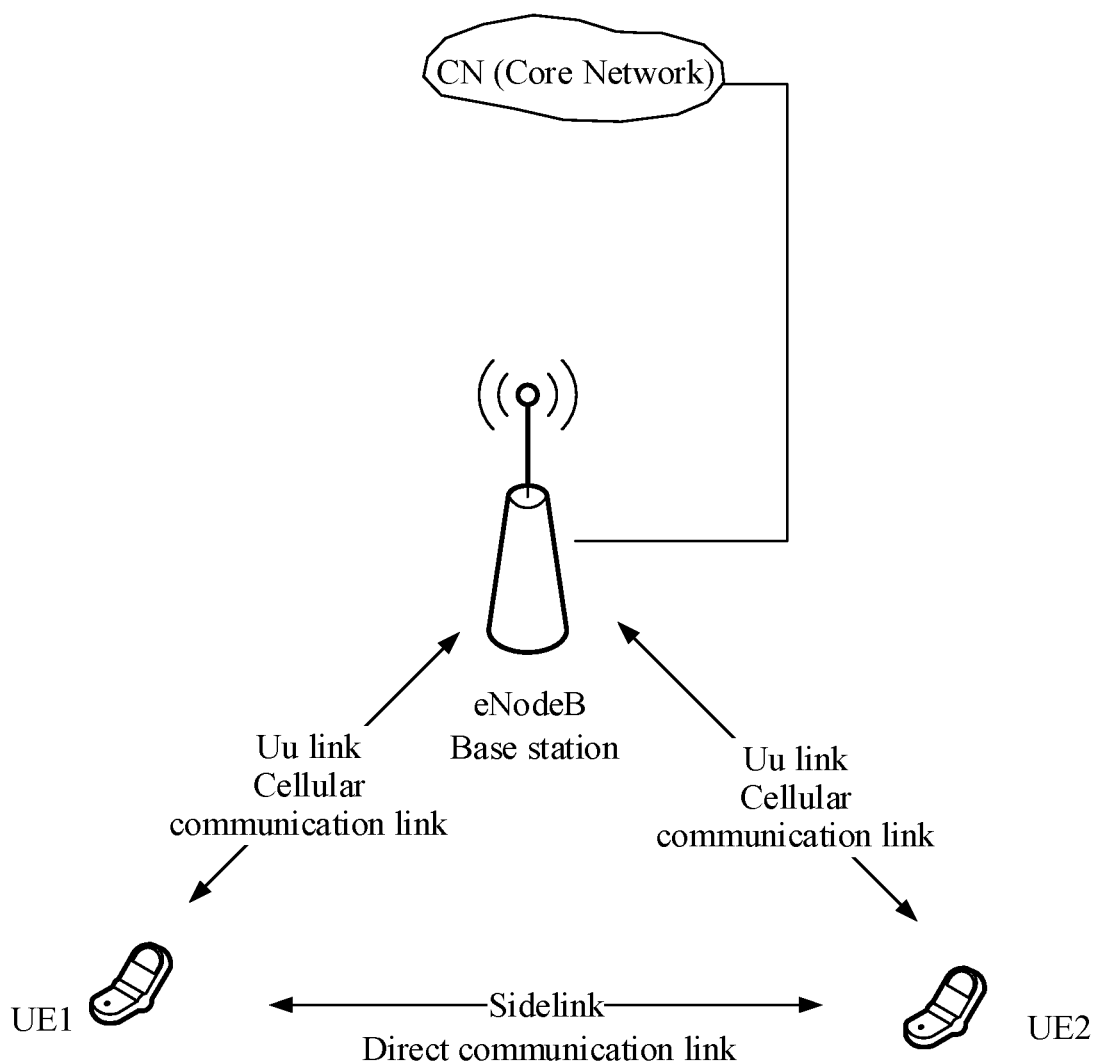
FIG. 1 is a schematic diagram of a system architecture according to an embodiment of the present application.

The embodiments of the present disclosure will be described clearly and completely with reference to the accompanying drawings.

It should be noted that the terms such as "first", "second" and the like in the specification and claims of the present application and the above drawings are used to distinguish the similar objects, but not necessarily to describe a particular order or sequence. It should be understood that the data used in this way is interchangeable under appropriate circumstances, and the embodiments of the present application described herein can be implemented in an order other than those illustrated or described herein. The implementation modes described in the following exemplary embodiments do not represent all the implementation modes consistent with the present application. On the contrary, they are only the examples of the devices and methods which are detailed in the attached claims and consistent with some embodiments of the present application.

Some terms that appear herein will be explained below.

1. The term "and/or" in the embodiments of the present application describes the association relationship of associated objects, indicating that there may be three relationships, for example, A and/or B may represent: only A, both A and B, and only B. The character "/" generally indicates that the associated objects have a kind of "or" relationship.

2. Acknowledge Character (ACK) information indicates that the received character is free of error. The receiving station checks a received message; and if no error is found, the receiving station sends an acknowledgment response ACK to the sending station, indicating that the message has been received correctly and it is ready to receive a next message. The control character can be sent by a central node or by a remote node.

3. Negative Acknowledge (NACK) information: the receiving station checks a received message; and if an error is found, the receiving station sends a negative response NACK to the sending station, indicating that the message has an error and retransmission is required.

4. Global Positioning System (GPS) is a system for positioning and navigating in real time on the global scale using positioning satellites, and is an omni-directional, all-weather, all-time and high-precision satellite navigation system, which can provide global users with the low-cost and high-precision navigation information such as 3D position, velocity, and precise timing.

5. Block Error Rate (BLER) is the percentage of blocks where errors occur in all sent blocks. The block error rate is a long-term statistical average and an important indicator reflecting the network performance and service quality.

In a wireless network, one device sends data to another device in blocks. The sender uses the data in the block to calculate a Cyclic Redundancy Check (CRC), and sends the CRC to the receiver together with the block. The receiver calculates a CRC according to the received data and compares this CRC with the received CRC. If they are equal, the receiver considers that it has received the correct data successfully, and replies with an ACK to the sender. If they are not equal, the receiver considers that it has received the erroneous data, and replies with an NACK to the sender to ask the sender to retransmit the block. For example, assuming that the data of 500 blocks is sent, ACKs are replied for 499 blocks and an NACK is replied for 1 block, then the BLER is 1/500=0.002*100%=0.2%.

6. Symbol Error Rate (SER) is an indicator to measure the accuracy of data transmission within the specified time. The Symbol Error Rate=erroneous symbols in transmission/total number of symbols transmitted*100%. In addition, the symbol error rate is also defined to be used to measure the frequency at which erroneous symbols occur. The research on symbol error rate under specific conditions is of great significance to enhance the performance of the wireless communication system and improve the quality of data transmission.

7. HARQ is a technology formed by combining Forward Error Correction (FEC) with Automatic Repeat Request (ARQ). When the decoding fails, the receiver saves the received data and requests the sender to retransmit the data. The receiver combines the retransmitted data with the previously received data before decoding.

The network architectures and service scenarios described in the embodiments of the present application are intended to illustrate the embodiments of the present application more clearly, and do not constitute a limitation on the embodiments of the present application. With the evolution of network architectures and the emergence of new service scenarios, the embodiments of the present application are also applicable to similar problems.

In order to make the embodiments of the present application clearer, the present application will be further illustrated below in details with reference to the accompanying figures. The described embodiments are merely a part of the embodiments of the present application but not all the embodiments.

The present application will be described below in detail with reference to the drawings.

FIG. 1 exemplarily shows a schematic diagram of a system architecture applicable to the embodiments of the present application. As shown in FIG. 1, a terminal 101 and a terminal 102 may communicate with a core network device 104 via an access network entity 103 in the future 5G system architecture. The terminal may refer to a UE (User Equipment), an access terminal, a user unit, a user station, a mobile radio station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, a vehicle-carried device, a wearable device, a terminal in the future 5G network, etc. For the convenience of description, FIG. 1 only illustrates two terminals. In an actual network, the terminals may coexist, which will not be repeated here.

The Access Network (AN) entity 103 may also be referred to as (Radio) Access Network ((R)AN) entity, which is collectively referred to as access network entity or (R)AN entity below, and is mainly responsible for providing a wireless connection for the terminal 101 and terminal 102, ensuring the reliable transmission of uplink and downlink data of the terminal 101 and terminal 102, and so on. The access network entity 103 may be a Next generation Node B (gNB) in the 5G system, or may be a Base Transceiver Station (BTS) in the Global System of Mobile communication (GSM) system or Code Division Multiple Access (CDMA), or may be a NodeB (NB) in the Wideband Code Division Multiple Access (WCDMA) system, or may be an evolutional Node B (eNB or eNodeB) in the Long Term Evolution (LTE) system, etc. In one embodiment, the access network entity in the embodiments of the present application is a satellite base station.

The core network device 104 is responsible for connecting the terminal device to different networks according to the call request or data request sent by the terminal device through the access network, as well as charging, mobility management, and so on. The core network device may be a 4G core network, an Evolved Packet Core (EPC), or a 5G core network device.

Here, the links through which the terminal 101 and the terminal 102 communicate with the core network device 104 via the access network entity 103 are cellular communication links between the network and terminals, and may also be called Uu links, and the corresponding interface is called a Uu interface. The link for communication between the terminal 101 and the terminal 102 is a direct communication link between devices, and may also be called a Sidelink, and the corresponding wireless interface is called a direct communication interface and also called a Sidelink interface.

It should be noted that the foregoing system architecture is only an example of the system architecture applicable to the embodiments of the present application. Compared with the system architecture shown in FIG. 1, the system architecture applicable to the embodiments of the present application can also add other entities or reduce some entities.

The direct communication between devices is allowed between devices close to each other. Typical direct communication scenarios include the following three types.

1. One-to-one communication between direct communication devices (also called unicast).

2. A device can send the same data to all devices in a communication group at a time (also called multicast).

3. A device can send the same data to all nearby devices at a time (also called broadcast).

The background information on the direct communication of two different systems will be introduced below.

(1) Introduction to the Related Background of the Direct Communication of the LTE System.

The devices for direct communication may all be online or offline, or some devices may be online and some devices may be offline. The so-called online means that the devices participating in the direct communication are located within the coverage of the communication carriers of the 3GPP base station, and the so-called offline means that the devices participating in the direct communication are not within the coverage of the communication carriers of the 3GPP base station.

It should be noted that the direct communication scenario supported by the LTE system is only broadcast.

In the direct communication of the LTE system, a method for a remote UE to select a relay UE is as follows: the remote UE takes the relay UEs with RSRP values of signals sent in the PC5 channel higher than a configured threshold as the candidate relay UEs, and then the remote UE selects, among the candidate relay UEs, a candidate relay UE with the highest PSRP value of the signal sent in the PC5 channel as the relay UE to be used.

As can be seen from the above, in the existing method for the remote UE to select the relay UE, the relay UE is selected only by determining the RSRP value of the signal sent by each candidate relay UE in the PC5 channel, and the candidate relay UE with the highest PSRP value is selected as the relay UE to be used. The method for determining the relay UE is too limited, resulting in the low reliability of the determined relay UE.

(2) Introduction to the Related Background of the Direct Communication of the New Radio (NR) System.

The unicast and multicast are introduced into the direct communication of the NR system, and the feedback is introduced into the unicast and multicast, that is, the receiver can feed back the CSI and/or HARQ feedback information to the sender, and the sender can adjust the sending parameters according to the CSI and/or retransmit the parameters according to the HARQ feedback information.

The present application invents a method for selecting a relay device by combining mechanisms such as PC5 channel HARQ feedback and PC5 interface measurement report in the NR system.

Figure 2:
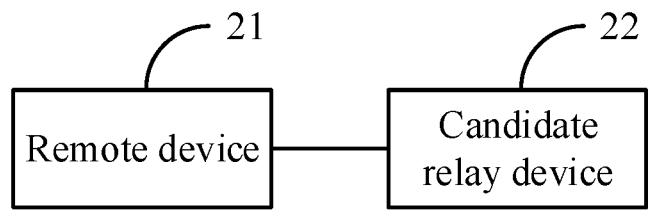
FIG. 2 is a schematic diagram of a system for selecting a relay device according to an embodiment of the present application.

As shown in FIG. 2, a system for selecting a relay device provided by an embodiment of the present application includes: a remote device 21 and at least one candidate relay device 22.

The remote device 21 is configured to: determine the channel quality information of a first sidelink and the channel quality information of a second sidelink between the remote device 21 and at least one candidate relay device 22; and select a relay device to be used from the at least one candidate relay device 22 according to the channel quality information of the first sidelink and the channel quality information of the second sidelink corresponding to the candidate relay device 22.

The at least one candidate relay device 22 is configured to: send a first measured signal to the remote device 21, and the remote device 21 determines the channel quality information of the first sidelink between the remote device 21 and the candidate relay device 22 according to the first measured signal; and determine the channel quality information of the second sidelink between the candidate relay device 22 and the remote device 21 according to a second measured signal sent by the remote device 21, and send the channel quality information of the second sidelink to the remote device 21, and the remote device 21 selects a relay device to be used according to the channel quality information of the first sidelink and the channel quality information of the second sidelink corresponding to the candidate relay device 22.

Here, the first sidelink is a sidelink for the candidate relay device 22 to send information to the remote device 21, and the second sidelink is a sidelink for the candidate relay device 22 to receive information from the remote device 21.

It should be noted that, when determining that the candidate relay device cannot meet the requirements according to the channel quality information of the first sidelink and the channel quality information of the second sidelink between the remote device and the candidate relay device, the remote device selects no relay device to be used this time, and can further re-determine a candidate relay device.

In the relay device selection methods provided by embodiments of the present application, the remote device determines the channel quality information of the first sidelink and the channel quality information of the second sidelink between the remote device and at least one candidate relay device, and then selects a relay device to be used from the at least one candidate relay device according to the channel quality information of the first sidelink and the channel quality information of the second sidelink corresponding to the candidate relay device. As can be seen from the above, when selecting a relay device, the remote device selects the relay device according to the channel quality information of the bidirectional sidelink between the remote device and the candidate relay device. In the embodiments of the present application, when selecting a relay device, the channel quality information of the first sidelink for the candidate relay device to send information to the remote device and the channel quality information of the second sidelink for the remote device to send information to the candidate relay device are both used as the reference information for selecting the relay device, and the relay device is selected according to the channel quality information of the bidirectional sidelink, improving the reliability of the selected relay device.

Here, the channel quality information includes some or all of:

CSI;
CQI;
RI;
SINR;
RSRP;
RSRQ;
RSSI;
block error rate;
bit error rate;
HARQ information.

Here, the HARQ information may be ACK (correct response) or NACK (error response).

When determining the channel quality information of the bidirectional sidelink between the remote device and at least one candidate relay device, the remote device firstly needs to determine a candidate relay device.

Some embodiments of the present application provide two methods for determining a candidate relay device. One method is: the remote device sends a relay request signal in the form of broadcasting; after a relay device receives the relay request signal sent by the remote device, the relay device sends the feedback information indicating that it can be used as a candidate relay device to the remote device if the relay device determines that it can be used by the remote device; and the remote device takes the relay device corresponding to the received feedback information as a candidate relay device. The other method is: the relay devices continuously broadcast relay signals that they can be used as candidate relay devices, and the remote device performs the relay signal detection when it needs to use a relay device, and takes the relay device corresponding to the detected relay signal as a candidate relay device.

It should be noted that the above two methods for determining the candidate relay device are only examples, and do not constitute a limitation on the protection scope of the embodiments of the present application.

After determining at least one candidate relay device, the remote device determines the channel quality information of the bidirectional sidelink between the remote device and the at least one candidate relay device, and selects a relay device to be used from the determined at least one candidate relay device according to the channel quality information of the bidirectional sidelink between the remote device and the at least one candidate relay device. It is necessary to note that, for the convenience of explaining the relay device selection method provided in the embodiment of the present application, the first sidelink is used to represent a sidelink for the candidate relay device to send information to the remote device, and the second sidelink is used to represent a sidelink for the candidate relay device to receive information from the remote device.

In one embodiment, the remote device determines the channel quality information of the first sidelink between the remote device and at least one candidate relay device in the following manner:

for any candidate relay device, the remote device determines the channel quality information of the first sidelink according to a first measured signal sent by the candidate relay device.

In some embodiments, the candidate relay device sends the first measured signal to the remote device, and the remote device determines the channel quality information of the first sidelink according to the first measured signal after receiving the first measured signal sent by the candidate relay device.

Here, the first measured signal sent by the candidate relay device to the remote device may be one of synchronization, broadcast, reference signal, signaling or data.

In an embodiment of the present application, the channel quality information of the first sidelink determined by the remote device according to the first measured signal includes at least one of CSI, CQI, RI, SINR, RSRP, RSRQ, RSSI, block error rate, bit error rate, HARQ information (ACK, NACK).

Here, for different types of channel quality information, the remote device determines the channel quality information of the first sidelink according to the first measured signal in different ways.

1. The channel quality information includes at least one of CSI, CQI, RI, SINR, RSRP, RSRQ or RSSI;
   the remote device measures the first measured signal to obtain the channel quality information of the first sidelink.

2. The channel quality information includes at least one of block error rate or bit error rate;
   the remote device determines the channel quality information of the first sidelink according to the first measured signal.

In some embodiments, the candidate relay device sends the first measured signal to the remote device, and the remote device determines the block error rate and the bit error rate of the first sidelink according to the received data packet of the first measured signal.

In one embodiment, the remote device performs statistics on the number of ACKs and the number of NACKs to obtain the block error rate and the bit error rate of the first sidelink.

It should be noted that the block error rate and the bit error rate can only be obtained after a period of data statistics. If the block error rate or the bit error rate is selected as the parameter of the channel quality information, the remote device can, for each candidate relay device, count the correctness and error of the received first measured signal data packets sent by the candidate relay device within a preset time period, to obtain the block error rate and the bit error rate of the first sidelink corresponding to the candidate relay device.

3. The channel quality information includes HARQ information;
   the remote device determines an HARQ feedback corresponding to the first measured signal, and generates the HARQ information.

Here, the HARQ information includes the number of ACKs and the number of NACKs determined by the remote device according to the first measured signal. The channel quality of the first sidelink between the remote device and the candidate relay device is reflected by the number of ACKs and the number of NACKs in the HARQ information.

In one embodiment, the remote device determines the channel quality information of the second sidelink with at least one candidate relay device in the following manner:

for any candidate relay device, the remote device sends a second measured signal to the candidate relay device;
the candidate relay device determines the channel quality information of the second sidelink according to the second measured signal, and returns the determined channel quality information of the second sidelink to the remote device;
the remote device receives the channel quality information of the second sidelink returned by the candidate relay device.

In some embodiments, the remote device sends the second measured signal to the candidate relay device; after receiving the second measured signal sent by the remote device, the candidate relay device determines the channel quality information of the second sidelink according to the second measured signal, and then the candidate relay device sends the channel quality information of the second sidelink to the remote device; and then the remote device determines the channel quality information of the second sidelink with the candidate relay device.

Here, the second measured signal sent by the remote device to the candidate relay device may be at least one of synchronization, broadcast, reference signal, signaling or data.

In an embodiment of the present application, the channel quality information of the second sidelink determined by the candidate relay device according to the second measured signal includes at least one of CSI, CQI, RI, SINR, RSRP, RSRQ, RSSI, block error rate, bit error rate, HARQ information (ACK, NACK).

Here, for different types of channel quality information, the candidate relay device determines the channel quality information of the second sidelink according to the second measured signal in different ways.

1. The channel quality information includes at least one of CSI, CQI, RI, SINR, RSRP, RSRQ or RSSI;
   the candidate relay device measures the second measured signal to obtain the channel quality information of the second sidelink, and sends the channel quality information of the second sidelink to the remote device.

2. The channel quality information includes at least one of block error rate or bit error rate;
   the candidate relay device determines the channel quality information of the second sidelink according to the second measured signal.

In some embodiments, the remote device sends the second measured signal to the candidate relay device, and the candidate relay device determines the block error rate and the bit error rate of the second sidelink according to the received data packet of the second measured signal, and sends the block error rate and the bit error rate of the second sidelink to the remote device.

In one embodiment, the candidate relay device counts the number of ACKs and the number of NACKs to obtain the block error rate and bit error rate of the second sidelink, and sends the block error rate and bit error rate of the second sidelink to the remote device.

It should be noted that the block error rate and the bit error rate can only be obtained after a period of data statistics. If the block error rate or the bit error rate is selected as the parameter of the channel quality information, the candidate relay device can count the correctness and error of the received second measured signal data packets sent by the remote device within a preset time period, to obtain the block error rate and the bit error rate of the second sidelink corresponding to the candidate relay device.

In one embodiment, the block error rate and bit error rate of the second sidelink can also be determined by the remote device.

In some embodiments, the remote device sends the second measured signal to the candidate relay device, the candidate relay device determines an HARQ feedback and performs the HARQ feedback to the remote device, and the remote device determines the block error rate and bit error rate of the second sidelink according to the HARQ feedback.

Here, the remote device performs statistics on the number of ACKs and the number of NACKs to obtain the block error rate and the bit error rate of the second sidelink.

3. The channel quality information includes HARQ information;

the candidate relay device determines an HARQ feedback corresponding to the second measured signal, and generates the HARQ information.

In one embodiment, the HARQ information of the second sidelink can also be determined by the remote device.

In some embodiments, the candidate relay device determines an HARQ feedback corresponding to the second measured signal and sends the HARQ feedback corresponding to the second measured signal to the remote device, and the remote device performs statistics according to the HARQ feedback received within a preset time period to generate the HARQ information.

Here, the HARQ information includes the number of ACKs and the number of NACKs determined by the candidate relay device according to the second measured signal. The channel quality of the second sidelink between the remote device and the candidate relay device is reflected by the number of ACKs and the number of NACKs in the HARQ information.

When the candidate relay device sends the channel quality information of the second sidelink to the remote device, one embodiment is to send a Sidelink CSI report or SL (Sidelink)-RSRP report or HARQ feedback to the remote device through a mechanism such as HARQ feedback of PC5 channel, or PC5 interface measurement report, etc., and the remote device obtains the channel quality information of the second sidelink according to the received Sidelink CSI report or SL-RSRP report or HARQ feedback.

The remote device selects a relay device to be used from the at least one candidate relay device after determining the channel quality information of the first sidelink and the channel quality information of the second sidelink between the remote device and the at least one candidate relay device in the above manner.

In one embodiment, for any candidate relay device: a parameter included in the channel quality information of the first sidelink and a parameter included in the channel quality information of the second sidelink corresponding to the candidate relay device are compared with thresholds corresponding to parameters, to determine whether the candidate relay device is an alternative relay device; and a relay device to be used is selected from the determined alternative relay devices.

In some embodiments, for any candidate relay device, the parameter included in the channel quality information of the first sidelink corresponding to the candidate relay device is compared with the corresponding threshold, and the parameter included in the channel quality information of the second sidelink corresponding to the candidate relay device is compared with the corresponding threshold, to determine whether the candidate relay device is an alternative relay device; and then a relay device to be used is selected from the determined alternative relay devices.

Here, when the parameter included in the channel quality information of the first sidelink corresponding to the candidate relay device is compared with the corresponding threshold and the parameter included in the channel quality information of the second sidelink corresponding to the candidate relay device is compared with the corresponding threshold, the candidate relay device that satisfies a first preset condition is determined as an alternative relay device, where the first preset condition includes some or all of:

Condition 1: if the channel quality information includes CSI, the CSI of the first sidelink is not less than a first threshold, and the CSI of the second sidelink is not less than a second threshold;

Condition 2: if the channel quality information includes CQI, the CQI of the first sidelink is not less than a third threshold, and the CQI of the second sidelink is not less than a fourth threshold;

Condition 3: if the channel quality information includes RI, the RI of the first sidelink is not less than a fifth threshold, and the RI of the second sidelink is not less than a sixth threshold;

Condition 4: if the channel quality information includes SINR, the SINR of the first sidelink is not less than a seventh threshold, and the SINR of the second sidelink is not less than an eighth threshold;

Condition 5: if the channel quality information includes RSRP, the RSRP of the first sidelink is not less than a ninth threshold, and the RSRP of the second sidelink is not less than a tenth threshold;

Condition 6: if the channel quality information includes RSRQ, the RSRQ of the first sidelink is not less than an eleventh threshold, and the RSRQ of the second sidelink is not less than a twelfth threshold;

Condition 7: if the channel quality information includes RSSI, the RSSI of the first sidelink is not less than a thirteenth threshold, and the RSSI of the second sidelink is not less than a fourteenth threshold;

Condition 8: if the channel quality information includes block error rate, the block error rate of the first sidelink is not greater than a fifteenth threshold, and the block error rate of the second sidelink is not greater than a sixteenth threshold;

Condition 9: if the channel quality information includes bit error rate, the bit error rate of the first sidelink is not greater than a seventeenth threshold, and the bit error rate of the second sidelink is not greater than an eighteenth threshold;

Condition 10: if the channel quality information includes HARQ information, the number of ACKs of the first sidelink is not less than a nineteenth threshold, and the number of ACKs of the second sidelink is not less than a twentieth threshold; or, the number of NACKs of the first sidelink is not greater than a twenty-first threshold, and the number of NACKs of the second sidelink is not greater than a twenty-second threshold.

The above-mentioned thresholds are pre-configured or configured by the network-side device for the remote device.

For example, for a terminal in the connected state, the network configures the thresholds through dedicated signaling; for an on-network terminal, the network configures the thresholds through broadcast signaling; and for an off-network terminal, the thresholds are configured in a pre-configured manner. In one embodiment, for any terminal, the thresholds are configured in a pre-configured manner. The specific values of the above thresholds are not limited in the embodiments of the present application.

In one embodiment, for any type of channel quality information, the threshold corresponding to the channel quality information of the first sidelink and the threshold corresponding to the channel quality information of the second sidelink may be the same or different. For example, for the channel quality information CSI, the first threshold and the second threshold may be the same or different.

It should be noted that, when the channel instruction information of the sidelink includes the parameters, it is determined that the candidate relay device can be used as an alternative relay device when it is determined that each parameter satisfies the corresponding condition.

For example, for any candidate relay device, if the channel quality information includes CSI and block error rate, the candidate relay device is determined as an alternative relay device when the value of the CSI of the first sidelink corresponding to the candidate relay device is not less than the first threshold, and the value of the CSI of the second sidelink is not less than the second threshold, and the value of the block error rate of the first sidelink is not greater than the fifteenth threshold, and the value of the block error rate of the second sidelink is not greater than the sixteenth threshold.

After the alternative relay devices are determined according to the channel quality information of the bidirectional sidelinks corresponding to the candidate relay devices, a relay device to be used is selected from the determined alternative relay devices.

In one embodiment, if at least two alternative relay devices are determined, the relay device to be used is selected from the at least two alternative relay devices according to parameters included in the channel quality information of first sidelinks and parameters included in the channel quality information of second sidelinks corresponding to the alternative relay devices.

In some embodiments, if there is only one alternative relay device determined, the alternative relay device is used as the relay device to be used;

if at least two alternative relay devices are determined, the alternative relay devices are comprehensively sorted according to the channel quality information of the bidirectional sidelink corresponding to each alternative relay device, and one or more of the alternative relay devices is/are selected as the relay device(s) to be used according to the sorting result.

In an implementation, the alternative relay devices may be sorted according to the size of the parameter included in the channel quality information of the first sidelink and the size of the parameter included in the channel quality information of the second sidelink corresponding to each alternative relay device.

If the channel quality information includes at least one of CSI, CQI, RI, SINR, RSRP, RSRQ, RSSI, or the number of ACKs in HARQ information, the alternative relay devices may be sorted in the following manners.

1. If the channel quality information includes one of CSI, CQI, RI, SINR, RSRP, RSRQ, RSSI, or the number of ACKs in HARQ information, in one embodiment, for any alternative relay device, the sum of the value of the parameter included in the channel quality information of the first sidelink corresponding to the alternative relay device and the value of the parameter included in the channel quality information of the second sidelink corresponding to the alternative relay device is used as a sorting index corresponding to the alternative relay device; and the alternative relay devices may be sorted according to their corresponding sorting indexes in an order from largest to smallest.

In one embodiment, the value of the channel quality information parameter on the link with the higher priority is sorted according to the priorities of the first sidelink and the second sidelink. Here, the priorities of the sidelinks may be pre-configured or configured by network.

2. If the channel quality information includes at least two of CSI, CQI, RI, SINR, RSRP, RSRQ, RSSI, or the number of ACKs in HARQ information, in one embodiment, for any alternative relay device, the sum of values of parameters included in the channel quality information of the first sidelink corresponding to the alternative relay device is determined, the sum of values of parameters included in the channel quality information of the second sidelink corresponding to the alternative relay device is determined, and the determined sums of the two sidelinks are summed to obtain a sorting index corresponding to the alternative relay device; and the alternative relay devices may be sorted according to their corresponding sorting indexes in an order from largest to smallest.

In one embodiment, the sum of values of the channel quality information parameters on the link with the higher priority is sorted according to the priorities of the first sidelink and the second sidelink. Here, the priorities of the sidelinks may be pre-configured or configured by network.

In one embodiment, different weights may also be assigned to the channel quality information of the first sidelink and the channel quality information of the second sidelink corresponding to the alternative relay device, and the summing is performed according to the weights corresponding to the sidelinks; or, when the channel quality information includes the parameters, different weights may be assigned to the parameters, and the summing is performed according to the weights corresponding to the parameters.

It should be noted that the above manner to sort the alternative relay devices comprehensively is only an example, and the alternative relay devices may also be comprehensively sorted in other manners.

If the channel quality information includes at least one of the block error rate, the bit error rate, and the number of NACKs in the HARQ information, the alternative relay devices may be sorted in the following manners.

1. If the channel quality information includes one of the block error rate, the bit error rate, or the number of NACKs in the HARQ information, in one embodiment, for any alternative relay device, the sum of the value of the parameter included in the channel quality information of the first sidelink corresponding to the alternative relay device and the value of the parameter included in the channel quality information of the second sidelink corresponding to the alternative relay device is used as a sorting index corresponding to the alternative relay device; and the alternative relay devices may be sorted according to their corresponding sorting indexes in an order from smallest to largest.

In one embodiment, the value of the channel quality information parameter on the link with the higher priority is sorted according to the priorities of the first sidelink and the second sidelink. Here, the priorities of the sidelinks may be pre-configured or configured by network.

2. If the channel quality information includes at least two of the block error rate, the bit error rate, or the number of NACKs in the HARQ information;

in one embodiment, for any alternative relay device, the sum of values of parameters included in the channel quality information of the first sidelink corresponding to the alternative relay device is determined, the sum of values of parameters included in the channel quality information of the second sidelink corresponding to the alternative relay device is determined, and the determined sums of the two sidelinks are summed to obtain a sorting index corresponding to the alternative relay device; and the alternative relay devices may be sorted according to their corresponding sorting indexes in an order from smallest to largest.

In one embodiment, the sum of values of the channel quality information parameters on the link with the higher priority is sorted according to the priorities of the first sidelink and the second sidelink. Here, the priorities of the sidelinks may be pre-configured or configured by network.

In one embodiment, different weights may also be assigned to the channel quality information of the first sidelink and the channel quality information of the second sidelink corresponding to the alternative relay device, and the summing is performed according to the weights corresponding to the sidelinks; or, when the channel quality information includes two parameters, different weights may be assigned to the parameters, and the summing is performed according to the weights corresponding to the parameters.

It should be noted that the above manner to sort the alternative relay devices comprehensively is only an example, and the alternative relay devices may also be comprehensively sorted in other manners.

If the channel quality information includes at least one of CSI, CQI, RI, SINR, RSRP, RSRQ, RSSI or the number of ACKs in the HARQ information and includes at least one of the block error rate, the bit error rate or the number of NACKs in the HARQ information, the alternative relay devices may be sorted in the following manners.

In one embodiment, for any alternative relay device, the sum of the value of at least one of CSI, CQI, RI, SINR, RSRP, RSRQ, RSSI or the number of ACKs in the HARQ information and the inverse of the value of at least one of the block error rate, the bit error rate or the number of NACKs in the HARQ information included in the channel quality information of the first sidelink corresponding to the alternative relay device is determined; the sum of the value of at least one of CSI, CQI, RI, SINR, RSRP, RSRQ, RSSI or the number of ACKs in the HARQ information and the inverse of the value of at least one of the block error rate, the bit error rate or the number of NACKs in the HARQ information included in the channel quality information of the second sidelink corresponding to the alternative relay device is determined; and the determined sums of the two sidelinks are summed to obtain a sorting index corresponding to the alternative relay device; and the alternative relay devices may be sorted according to their corresponding sorting indexes in an order from largest to smallest.

In one embodiment, the sum of the value of at least one of CSI, CQI, RI, SINR, RSRP, RSRQ, RSSI or the number of ACKs in the HARQ information and the inverse of the value of at least one of the block error rate, the bit error rate or the number of NACKs in the HARQ information included in the channel quality information on the link with the higher priority is sorted according to the priorities of the first sidelink and the second sidelink. Here, the priorities of the sidelinks may be pre-configured or configured by network.

In one embodiment, different weights may also be assigned to the channel quality information of the first sidelink and the channel quality information of the second sidelink corresponding to the alternative relay device, and the summing is performed according to the weights corresponding to the sidelinks; or, when the channel quality information includes the parameters, different weights may be assigned to the parameters, and the summing is performed according to the weights corresponding to the parameters.

It should be noted that the above manner to sort the alternative relay devices comprehensively is only an example, and the alternative relay devices may also be comprehensively sorted in other manners.

Figure 3:
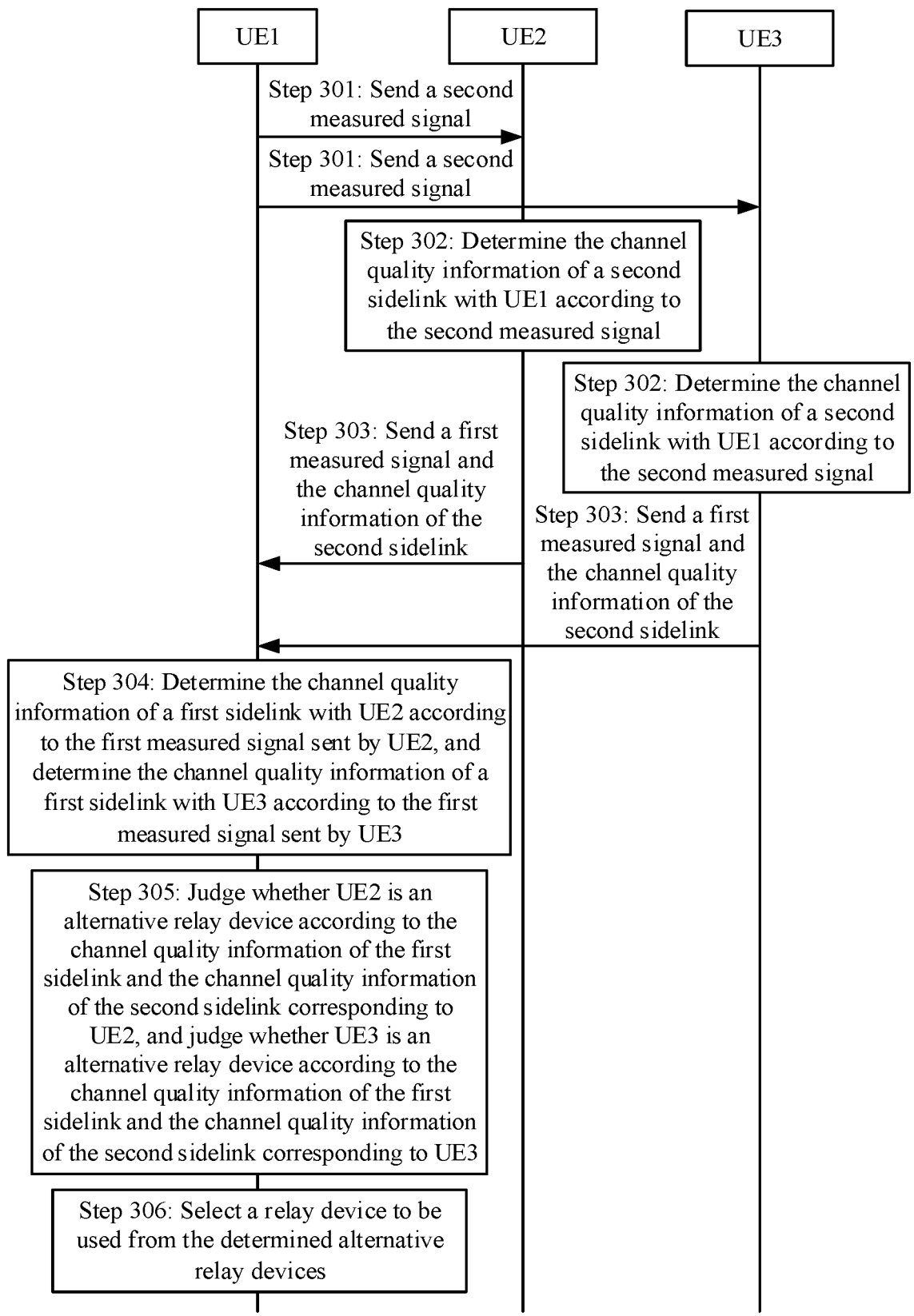
FIG. 3 is an interactive flowchart of a relay device selection method according to an embodiment of the present application.

As shown in FIG. 3, it is an interaction flowchart of a relay device selection method provided by an embodiment of the present application, where the remote device is UE1 and the candidate relay devices are UE2 and UE3 as an example.

Step 301: UE1 sends a second measured signal to UE2/UE3.

Step 302: UE2/UE3 determines the channel quality information of a second sidelink with UE1 according to the second measured signal.

Step 303: UE2/UE3 sends a first measured signal and the channel quality information of the second sidelink to UE1.

Step 304: UE1 determines the channel quality information of a first sidelink with UE2 according to the first measured signal sent by UE2, and determines the channel quality information of a first sidelink with UE3 according to the first measured signal sent by UE3.

Step 305: UE1 determines whether UE2 is an alternative relay device according to the channel quality information of the first sidelink and the channel quality information of the second sidelink corresponding to UE2, and determines whether UE3 is an alternative relay device according to the channel quality information of the first sidelink and the channel quality information of the second sidelink corresponding to UE3.

Step 306: UE1 selects a relay device to be used from the determined alternative relay devices.

The relay device selection method provided by the embodiment of the present application is applicable to a process of initially selecting a relay device by the remote device, and also to a process of performing relay reselection after the remote device determines that a relay needs to be reselected.

Figure 4:
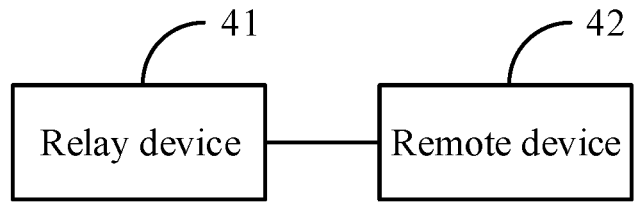
FIG. 4 is a schematic diagram of a system for determining to reselect a relay device according to an embodiment of the present application.

As shown in FIG. 4, a system for determining to reselect a relay device provided by an embodiment of the present application includes: a relay device 41 and a remote device 42; where the relay device 41 is the relay device currently used by the remote device 42.

The relay device 41 is configured to determine the auxiliary information for assisting the remote device 42 to determine whether to reselect a relay device to be used; and send the auxiliary information to the remote device 42.

The remote device 42 is configured to determine that a relay device to be used needs to be reselected according to the auxiliary information, and select the relay device to be used according to the channel quality information of a first sidelink and the channel quality information of a second sidelink between the remote device 42 and at least one candidate relay device.

Here, the sidelink interaction between the relay device and the remote device may be the transmission of any direct channel, such as Physical Sidelink Control Channel (PSCCH), Physical Sidelink Shared Channel (PSSCH), Physical Sidelink Broadcast Channel (PSBCH), or synchronization signal, etc.

In an implementation, the relay device determines the auxiliary information for assisting the remote device to determine whether to reselect a relay device to be used, and sends the auxiliary information to the remote device. After receiving the auxiliary information, the remote device determines whether to perform relay reselection according to the auxiliary information.

Here, according to different types of auxiliary information, the remote device may determine whether to perform relay reselection according to the following methods in an embodiment of the present application.

Method 1: The remote device determines that a relay device to be used needs to be reselected according to the channel quality information of a third sidelink and the channel quality information of a fourth sidelink between the remote device and a currently used relay device.

Here, the auxiliary information includes a third measured signal and the channel quality information of the fourth sidelink.

In an implementation, the relay device sends the third measured signal to the remote device, and the remote device determines the channel quality information of the third sidelink according to the third measured signal sent by the relay device;
  the remote device sends a fourth measured signal to the relay device, and the relay device determines the channel quality information of the fourth sidelink according to the fourth measured signal sent by the remote device, and sends the channel quality of the fourth sidelink to the remote device;
  the remote device determines that a relay device to be used needs to be reselected according to the channel quality information of the third sidelink and the channel quality information of the fourth sidelink between the remote device and the relay device.

Here, the third sidelink is a sidelink for the relay device to send information to the remote device, and the fourth sidelink is a sidelink for the relay device to receive information from the remote device.

In some embodiments, the remote device sends the fourth measured signal to the relay device, the relay device determines the channel quality information of the fourth sidelink according to the fourth measured signal sent by the remote device, and the relay device sends the third measured signal and the channel quality information of the fourth sidelink to the remote device; the remote device determines the channel quality information of the third sidelink according to the third measured signal sent by the relay device; the remote device determines whether a relay device to be used needs to be reselected according to the channel quality information of the third sidelink and the channel quality information of the fourth sidelink. If a relay device to be used needs to be reselected, the relay device is reselected according to the relay selection method provided in embodiments of the present application.

Here, the third measured signal and the fourth measured signal may be one of synchronization, broadcast, reference signal, signaling or data.

The channel quality information of the third sidelink and the channel quality information of the fourth sidelink include at least one of: CSI, CQI, RI, SINR, RSRP, RSRQ, RSSI, block error rate, bit error rate, or HARQ information (ACK, NACK).

Here, for different types of channel quality information, the remote device determines the channel quality information of the third sidelink according to the third measured signal in different ways.

1. The channel quality information includes at least one of CSI, CQI, RI, SINR, RSRP, RSRQ or RSSI;
  the remote device measures the third measured signal to obtain the channel quality information of the third sidelink.

2. The channel quality information includes at least one of block error rate or bit error rate;
  the remote device determines the channel quality information of the third sidelink according to the third measured signal.

In some embodiments, the relay device sends the third measured signal to the remote device, and the remote device determines the block error rate and the bit error rate of the third sidelink according to the received data packet of the third measured signal.

In one embodiment, the remote device performs statistics on the number of ACKs and the number of NACKs to obtain the block error rate and the bit error rate of the third sidelink.

It should be noted that the block error rate and the bit error rate can only be obtained after a period of data statistics. If the block error rate or the bit error rate is selected as the parameter of the channel quality information, the remote device can count the correctness and error of the received third measured signal data packets sent by the relay device within a preset time period, to obtain the block error rate and the bit error rate of the third sidelink corresponding to the currently used relay device.

3. The channel quality information includes HARQ information;
  the remote device determines an HARQ feedback corresponding to the third measured signal, and generates the HARQ information.

Here, the HARQ information includes the number of ACKs and the number of NACKs determined by the remote device according to the third measured signal. The channel quality of the third sidelink between the remote device and the currently used relay device is reflected by the number of ACKs and the number of NACKs in the HARQ information.

Also, for different types of channel quality information, the relay device determines the channel quality information of the fourth sidelink according to the fourth measured signal in different ways.

1. The channel quality information includes at least one of CSI, CQI, RI, SINR, RSRP, RSRQ or RSSI;
  the relay device measures the fourth measured signal to obtain the channel quality information of the fourth sidelink, and sends the channel quality information of the fourth sidelink to the remote device.

2. The channel quality information includes at least one of block error rate or bit error rate;

the relay device determines the channel quality information of the fourth sidelink according to the fourth measured signal.

In some embodiments, the remote device sends the fourth measured signal to the relay device, and the relay device determines the block error rate and the bit error rate of the fourth sidelink according to the received data packet of the fourth measured signal, and sends the block error rate and the bit error rate of the fourth sidelink to the remote device.

In one embodiment, the relay device performs statistics on the number of ACKs and the number of NACKs to obtain the block error rate and the bit error rate of the fourth sidelink.

It should be noted that the block error rate and the bit error rate can only be obtained after a period of data statistics. If the block error rate or the bit error rate is selected as the parameter of the channel quality information, the relay device can count the correctness and error of the received fourth measured signal data packets sent by the remote device within a preset time period, to obtain the block error rate and the bit error rate of the fourth sidelink corresponding to the currently used relay device.

In one embodiment, the block error rate and bit error rate of the fourth sidelink can also be determined by the remote device.

In some embodiments, the remote device sends the fourth measured signal to the relay device, the relay device determines an HARQ feedback and performs the HARQ feedback to the remote device, and the remote device determines the block error rate and bit error rate of the fourth sidelink according to the HARQ feedback.

Here, the remote device performs statistics on the number of ACKs and the number of NACKs to obtain the block error rate and the bit error rate of the fourth sidelink.

3. The channel quality information includes HARQ information;
the relay device determines an HARQ feedback corresponding to the fourth measured signal, and generates the HARQ information.

In one embodiment, the HARQ information of the fourth sidelink can also be determined by the remote device.

In some embodiments, the relay device determines an HARQ feedback corresponding to the fourth measured signal and sends the HARQ feedback corresponding to the fourth measured signal to the remote device, and the remote device performs statistics according to the HARQ feedback received within a preset time period to generate the HARQ information.

Here, the HARQ information includes the number of ACKs and the number of NACKs determined by the relay device according to the fourth measured signal. The channel quality of the fourth sidelink between the remote device and the currently used relay device is reflected by the number of ACKs and the number of NACKs in the HARQ information.

When the relay device sends the channel quality information of the fourth sidelink to the remote device, one embodiment is to send a Sidelink CSI report or SL-RSRP report or HARQ feedback to the remote device through a mechanism such as HARQ feedback of PC5 channel, or PC5 interface measurement report, etc., and the remote device obtains the channel quality information of the fourth sidelink according to the received Sidelink CSI report or SL-RSRP report or HARQ feedback.

After receiving the auxiliary information, the remote device determines whether to perform relay reselection according to the auxiliary information. When the auxiliary information is the third measured signal and the channel quality information of the fourth sidelink, the remote device determines whether a relay device needs to be reselected according to the determined channel quality information of the third sidelink and the received channel quality information of the fourth sidelink.

In one embodiment, the remote device compares a parameter included in the channel quality information of the third sidelink and a parameter included in the channel quality information of the fourth sidelink corresponding to the relay device with thresholds corresponding to parameters, and determines that the relay device to be used needs to be reselected according to a comparison result.

In some embodiments, the remote device compares the parameter included in the channel quality information of the third sidelink with the corresponding threshold, compares the parameter included in the channel quality information of the fourth sidelink with the corresponding threshold, and determines whether a relay device to be used needs to be reselected according to the comparison result.

Here, after comparing the parameter included in the channel quality information of the third sidelink corresponding to the relay device with the corresponding threshold and comparing the parameter included in the channel quality information of the fourth sidelink corresponding to the relay device with the corresponding threshold, the remote device determines that the relay device to be used needs to be reselected if the comparison result satisfies a second preset condition, where the second preset condition includes one of:

Condition 1: if the channel quality information includes CSI, the CSI of the third sidelink is less than a twenty-third threshold, and/or the CSI of the fourth sidelink is less than a twenty-fourth threshold;

Condition 2: if the channel quality information includes CQI, the CQI of the third sidelink is less than a twenty-fifth threshold, and/or the CQI of the fourth sidelink is less than a twenty-sixth threshold;

Condition 3: if the channel quality information includes RI, the RI of the third sidelink is less than a twenty-seventh threshold, and/or the RI of the fourth sidelink is less than a twenty-eighth threshold;

Condition 4: if the channel quality information includes SINR, the SINR of the third sidelink is less than a twenty-ninth threshold, and/or the SINR of the fourth sidelink is less than a thirtieth threshold;

Condition 5: if the channel quality information includes RSRP, the RSRP of the third sidelink is less than a thirty-first threshold, and/or the RSRP of the fourth sidelink is less than a thirty-second threshold;

Condition 6: if the channel quality information includes RSRQ, the RSRQ of the third sidelink is less than a thirty-third threshold, and/or the RSRQ of the fourth sidelink is less than a thirty-fourth threshold;

Condition 7: if the channel quality information includes RSSI, the RSSI of the third sidelink is less than a thirty-fifth threshold, and/or the RSSI of the fourth sidelink is less than a thirty-sixth threshold;

Condition 8: if the channel quality information includes block error rate, the block error rate of the third sidelink is greater than a thirty-seventh threshold, and/or the block error rate of the fourth sidelink is greater than a thirty-eighth threshold;

Condition 9: if the channel quality information includes bit error rate, the bit error rate of the third sidelink is greater than a thirty-ninth threshold, and/or the bit error rate of the fourth sidelink is greater than a fortieth threshold;

Condition 10: if the channel quality information includes HARQ information, the number of ACKs of the third sidelink is less than a forty-first threshold, and/or the number of ACKs of the fourth sidelink is less than a forty-second threshold; or, the number of NACKs of the third sidelink is greater than a forty-third threshold, and the number of NACKs of the fourth sidelink is greater than a forty-fourth threshold.

The above-mentioned thresholds are pre-configured or configured by the network-side device for the remote device. For example, for a terminal in the connected state, the network configures the thresholds through dedicated signaling; for an on-network terminal, the network configures the thresholds through broadcast signaling; and for an off-network terminal, the thresholds are configured in a pre-configured manner. In one embodiment, for any terminal, the thresholds are configured in a pre-configured manner. The specific values of the above thresholds are not limited in the embodiments of the present application.

For the channel quality information of the bidirectional sidelink between the currently used relay device and the remote device, when the parameters of the channel quality information in any direction satisfy the second preset condition, the relay device needs to be reselected. For example, for the currently used relay device, if the channel quality information only includes RSRQ, it is determined that the relay device to be used needs to be reselected in three cases as follows:

Case 1: the RSRQ of the third sidelink is less than the thirty-third threshold, and the RSRQ of the fourth sidelink is not less than the thirty-fourth threshold;

Case 2: the RSRQ of the third sidelink is not less than the thirty-third threshold, and the RSRQ of the fourth sidelink is less than the thirty-fourth threshold;

Case 3: the RSRQ of the third sidelink is less than the thirty-third threshold, and the RSRQ of the fourth sidelink is less than the thirty-fourth threshold.

When the RSRQ of the third sidelink is not less than the thirty-third threshold and the RSRQ of the fourth sidelink is not less than the thirty-fourth threshold, the remote device determines not to reselect the relay device.

Figure 5:
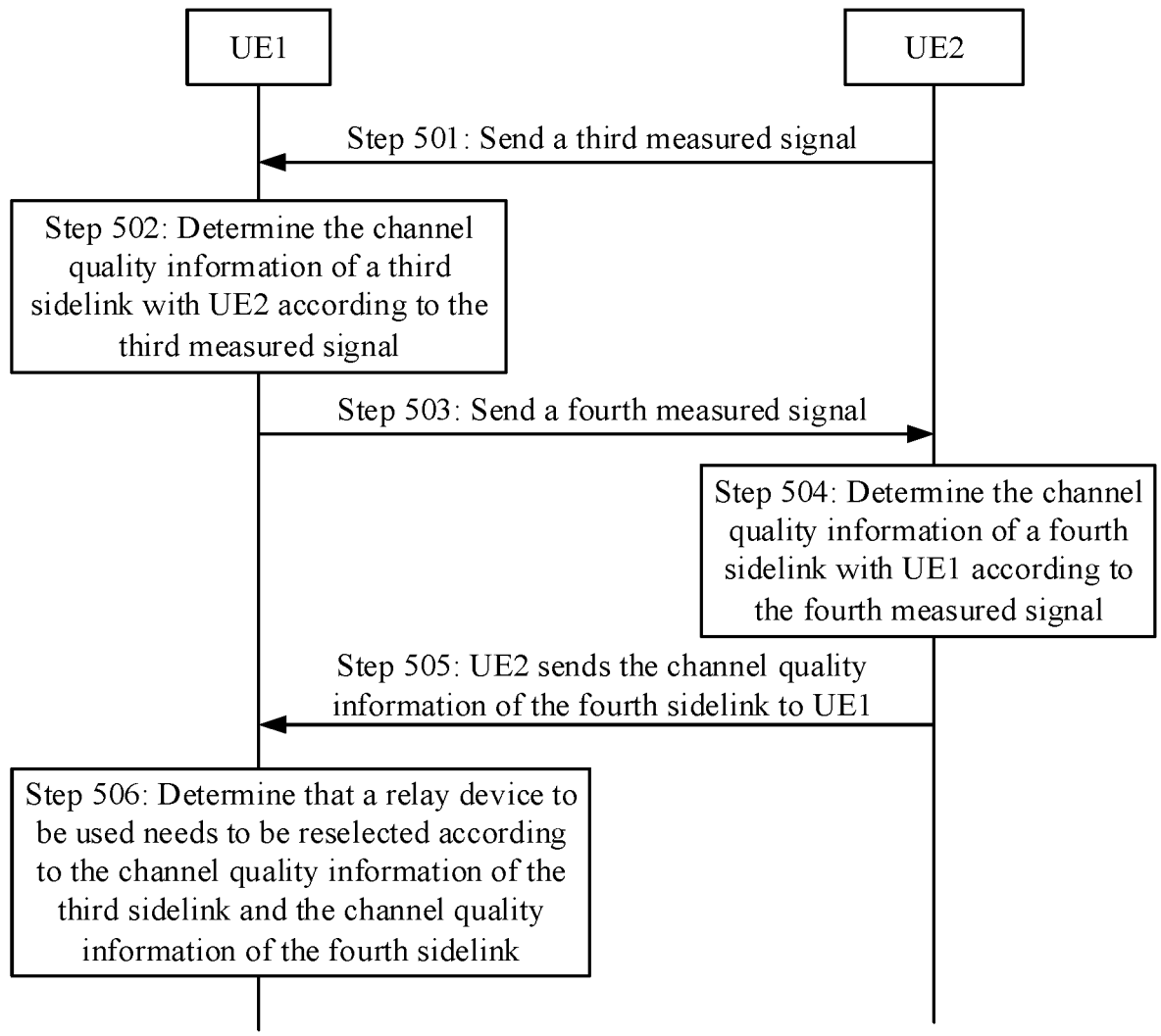
FIG. 5 is an interactive flowchart of a relay device selection method according to an embodiment of the present application.

As shown in FIG. 5, it is an interaction flowchart of a relay device selection method provided by an embodiment of the present application, where the remote device is UE1, the relay device is UE2, and the relay device UE2 is the currently used relay device.

Step 501: UE2 sends a third measured signal to UE1.

Step 502: UE1 determines the channel quality information of a third sidelink with UE2 according to the third measured signal sent by UE2.

Step 503: UE1 sends a fourth measured signal to UE2.

Step 504: UE2 determines the channel quality information of a fourth sidelink with UE1 according to the fourth measured signal.

Step 505: UE2 sends the channel quality information of the fourth sidelink to UE1.

Step 506: UE1 determines that a relay device to be used needs to be reselected according to the channel quality information of the third sidelink and the channel quality information of the fourth sidelink.

Here, the order of execution of steps 501 to 502 and steps 503 to 505 is not limited. It is possible to execute steps 501 to 502 before steps 503 to 505, or execute steps 503 to 505 before steps 501 to 502, or execute steps 501 to 502 and steps 503 to 505 simultaneously.

In one embodiment, UE2 may send the third measured signal and the channel quality information of the fourth sidelink to UE1 at the same time.

Method 2: The relay device instructs the remote device to reselect a relay device to be used after determining that the remote device needs to reselect the relay device to be used.

Here, the auxiliary information is indication information for indicating that the relay device to be used needs to be reselected.

The relay device may determine that the remote device needs to reselect a relay device to be used in the following ways.

In a first way, the relay device generates the indication information for indicating that the relay device to be used needs to be reselected according to the channel quality information of the third sidelink and the channel quality information of the fourth sidelink between the relay device and the remote device.

Here, the third sidelink is a sidelink for the relay device to send information to the remote device, and the fourth sidelink is a sidelink for the relay device to receive information from the remote device.

When the channel quality of the third sidelink or the fourth sidelink for communication between the remote device and the currently used relay device is poor, the relay device generates the indication information to indicate that the remote device needs to reselect the relay device to be used.

In a second way, the relay device generates the indication information for indicating that the relay device to be used needs to be reselected according to the quality of a cellular communication link between the relay device and a network side device.

It should be noted that the remote device communicates with the network side device through the relay device because the remote device is a device at the edge of the coverage of the base station or outside the coverage of the base station. If the quality of the cellular communication link (Uulink) between the currently used relay device and the network side device is poor, the relay device generates the indication information to indicate that the remote device needs to reselect the relay device to be used.

In a third way, the relay device generates the indication information for indicating that the relay device to be used needs to be reselected according to the working state of the relay device.

Here, the working state of the relay device may be the power, load, etc. of the relay device. If the working state of the relay device is poor, for example, the power of the relay device is low, or the load of the currently used relay device is large due to a large number of remote devices that communicate with the currently used relay device, the relay device generates the indication information to indicate that the remote device needs to reselect the relay device to be used.

After receiving the indication information sent by the relay device, the remote device determines that the relay device to be used needs to be reselected.

Some embodiments of the present application mainly introduce the way in which the relay device generates the indication information according to the channel quality information of the third sidelink and the channel quality information of the fourth sidelink with the remote device.

In an implementation, the relay device determines whether a relay device to be used needs to be reselected according to the channel quality information of the bidirectional sidelink. If the relay device determines that the currently used relay device needs to be reselected, the relay device generates the indication information and sends the generated indication information to the remote device. After receiving the indication information, the remote device determines that the relay device to be used needs to be reselected.

In one embodiment, the relay device determines the channel quality information of the third sidelink in the following manner.

The relay device sends a third measured signal to the remote device, and the remote device determines the channel quality information of the third sidelink according to the third measured signal and returns the channel quality information of the third sidelink to the relay device.

The relay device receives the channel quality information of the third sidelink determined according to the third measured signal and returned by the remote device.

Here, the third measured signal sent by the relay device to the remote device may be at least one of synchronization, broadcast, reference signal, signaling or data.

In an embodiment of the present application, the channel quality information of the third sidelink determined by the remote device according to the third measured signal includes at least one of CSI, CQI, RI, SINR, RSRP, RSRQ, RSSI, block error rate, bit error rate, HARQ information (ACK, NACK).

It should be noted that the manner in which the remote device determines the channel quality information of the third sidelink according to the third measured signal and the manner in which the relay device determines the channel quality information of the fourth sidelink according to the fourth measured signal may refer to the above description.

When the remote device sends the channel quality information of the third sidelink to the relay device, one embodiment is to send a sidelink CSI report or SL-RSRP report or HARQ feedback to the relay device through a mechanism such as HARQ feedback of PC5 channel, or PC5 interface measurement report, etc., and the relay device obtains the channel quality information of the third sidelink according to the received sidelink CSI report or SL-RSRP report or HARQ feedback.

After determining the channel quality information of the third sidelink and the channel quality information of the fourth sidelink in the above-mentioned manners, the relay device determines whether to generate the indication information according to the channel quality information of the third sidelink and the channel quality information of the fourth sidelink.

In one embodiment, the relay device compares a parameter included in the channel quality information of the third sidelink and a parameter included in the channel quality information of the fourth sidelink with thresholds corresponding to parameters, and generates the indication information according to a comparison result.

In some embodiments, the relay device compares the parameter included in the channel quality information of the third sidelink with the corresponding threshold, compares the parameter included in the channel quality information of the fourth sidelink with the corresponding threshold, and determines whether a relay device to be used needs to be reselected. If the relay device to be used needs to be reselected, the indication information is generated.

Here, when comparing the parameter included in the channel quality information of the third sidelink with the corresponding threshold and comparing the parameter included in the channel quality information of the fourth sidelink with the corresponding threshold, the relay device determines that the relay device to be used needs to be reselected if the comparison result satisfies a second preset condition, where the second preset condition includes one of:

Condition 1: if the channel quality information includes CSI, the CSI of the third sidelink is less than a twenty-third threshold, and/or the CSI of the fourth sidelink is less than a twenty-fourth threshold;

Condition 2: if the channel quality information includes CQI, the CQI of the third sidelink is less than a twenty-fifth threshold, and/or the CQI of the fourth sidelink is less than a twenty-sixth threshold;

Condition 3: if the channel quality information includes RI, the RI of the third sidelink is less than a twenty-seventh threshold, and/or the RI of the fourth sidelink is less than a twenty-eighth threshold;

Condition 4: if the channel quality information includes SINR, the SINR of the third sidelink is less than a twenty-ninth threshold, and/or the SINR of the fourth sidelink is less than a thirtieth threshold;

Condition 5: if the channel quality information includes RSRP, the RSRP of the third sidelink is less than a thirty-first threshold, and/or the RSRP of the fourth sidelink is less than a thirty-second threshold;

Condition 6: if the channel quality information includes RSRQ, the RSRQ of the third sidelink is less than a thirty-third threshold, and/or the RSRQ of the fourth sidelink is less than a thirty-fourth threshold;

Condition 7: if the channel quality information includes RSSI, the RSSI of the third sidelink is less than a thirty-fifth threshold, and/or the RSSI of the fourth sidelink is less than a thirty-sixth threshold;

Condition 8: if the channel quality information includes block error rate, the block error rate of the third sidelink is greater than a thirty-seventh threshold, and/or the block error rate of the fourth sidelink is greater than a thirty-eighth threshold;

Condition 9: if the channel quality information includes bit error rate, the bit error rate of the third sidelink is greater than a thirty-ninth threshold, and/or the bit error rate of the fourth sidelink is greater than a fortieth threshold;

Condition 10: if the channel quality information includes HARQ information, the number of ACKs of the third sidelink is less than a forty-first threshold, and/or the number of ACKs of the fourth sidelink is less than a forty-second threshold; or, the number of NACKs of the third sidelink is greater than a forty-third threshold, and the number of NACKs of the fourth sidelink is greater than a forty-fourth threshold.

The above-mentioned thresholds are pre-configured or configured by the network-side device for the remote device. For example, for a terminal in the connected state, the network configures the thresholds through dedicated signaling; for an on-network terminal, the network configures the thresholds through broadcast signaling; and for an off-network terminal, the thresholds are configured in a pre-configured manner. In one embodiment, for any terminal, the thresholds are configured in a pre-configured manner. The specific values of the above thresholds are not limited in the embodiments of the present application, and may be empirical values.

For the channel quality information of the bidirectional sidelink between the currently used relay device and the remote device, when the parameters of the channel quality information in any direction satisfy the second preset condition, the relay device needs to be reselected. For example, if the channel quality information only includes the block error rate, it is determined that the relay device to be used needs to be reselected in three cases as follows.

If the channel quality information includes block error rate, the block error rate of the third sidelink is greater than the thirty-seventh threshold, and/or the block error rate of the fourth sidelink is greater than the thirty-eighth threshold;

Case 1: the block error rate of the third sidelink is greater than the thirty-seventh threshold, and the block error rate of the fourth sidelink is not greater than the thirty-eighth threshold;

Case 2: the block error rate of the third sidelink is not greater than the thirty-seventh threshold, and the block error rate of the fourth sidelink is greater than the thirty-eighth threshold;

Case 3: the block error rate of the third sidelink is greater than the thirty-seventh threshold, and the block error rate of the fourth sidelink is greater than the thirty-eighth threshold.

When the block error rate of the third sidelink is not greater than the thirty-seventh threshold and the block error rate of the fourth sidelink is not greater than the thirty-eighth threshold, the relay device determines not to reselect a relay device.

Figure 6:
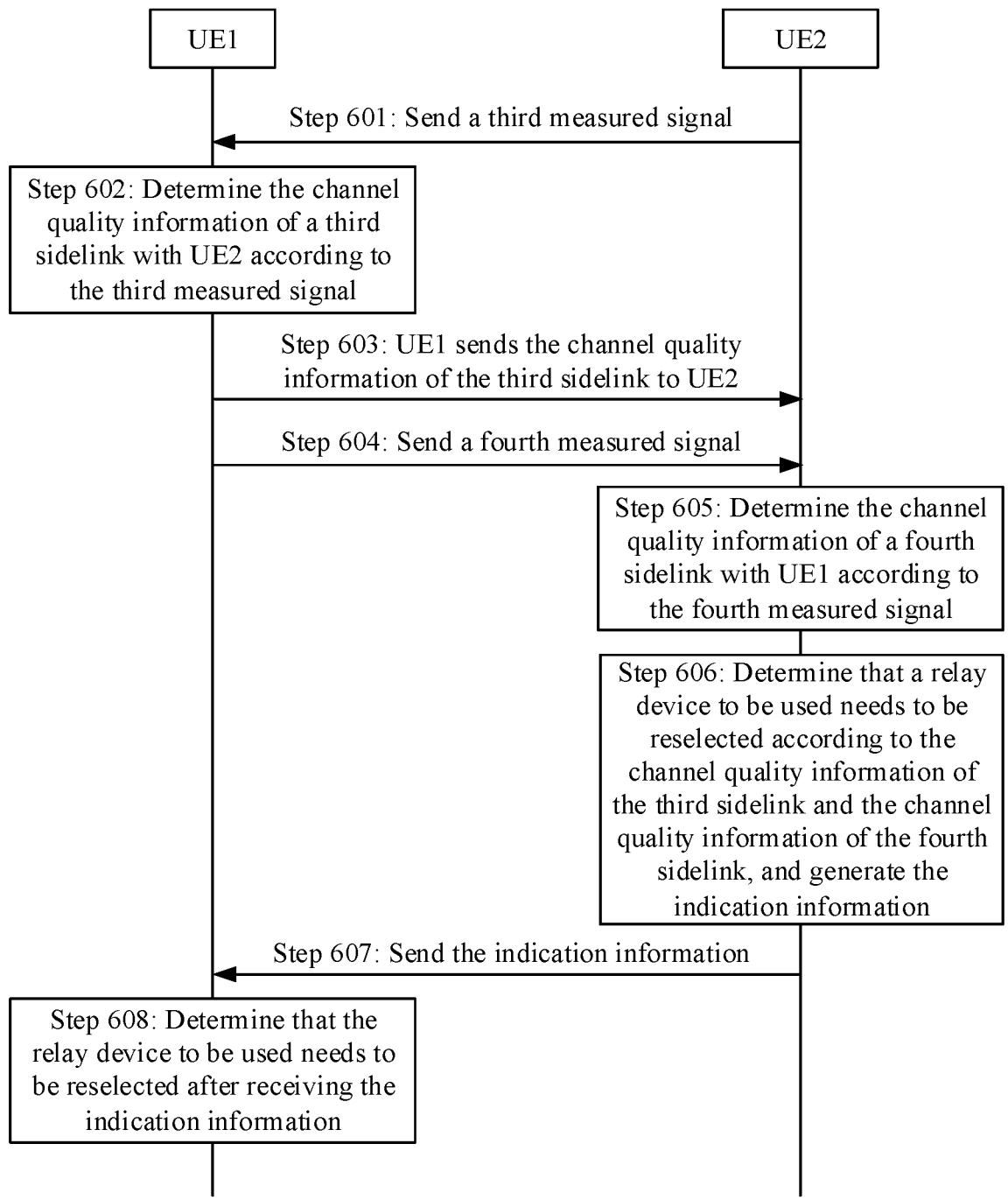
FIG. 6 is an interactive flowchart of another relay device selection method according to an embodiment of the present application.

As shown in FIG. 6, it is an interaction flowchart of a relay device selection method provided by an embodiment of the present application, where the remote device is UE1, the relay device is UE2, and the relay device UE2 is the currently used relay device.

Step 601: UE2 sends a third measured signal to UE1.

Step 602: UE1 determines the channel quality information of a third sidelink with UE2 according to the third measured signal sent by UE2.

Step 603: UE1 sends the channel quality information of the third sidelink to UE2.

Step 604: UE1 sends a fourth measured signal to UE2.

Step 605: UE2 determines the channel quality information of a fourth sidelink with UE1 according to the fourth measured signal.

Step 606: UE2 determines that a relay device to be used needs to be reselected according to the channel quality information of the third sidelink and the channel quality information of the fourth sidelink, and generates the indication information.

Step 607: UE2 sends the indication information to UE1.

Step 608: UE1 determines that the relay device to be used needs to be reselected after receiving the indication information.

Here, the order of execution of steps 601 to 603 and steps 604 to 605 is not limited. It is possible to execute steps 601 to 603 before steps 604 to 605, or execute steps 604 to 605 before steps 601 to 603, or execute steps 601 to 603 and steps 604 to 605 simultaneously.

In one embodiment, UE1 may send the channel quality information of the third sidelink and the fourth measured signal to UE2 at the same time.

As can be seen from the above, in the method for triggering the remote device to perform relay reselection provided by embodiments of the present application, the relay device or the remote device determines whether a relay device to be used needs to be reselected according to the channel quality information of the bidirectional sidelink. If it is determined that the relay device reselection needs to be performed, the remote device is triggered to perform the relay device reselection. The way to determine whether a relay device to be used needs to be reselected according to the channel quality information of the bidirectional sidelink, improves the reliability of judging whether to perform the relay device reselection.

Based on the same inventive concept, an embodiment of the present application further provides a remote device. Since the principle of the device to solve the problem is similar to that of the relay device selection method in the embodiment of the present application, the implementations of the device can refer to the implementations of the method, and the repeated description thereof will be omitted here.

Figure 7:
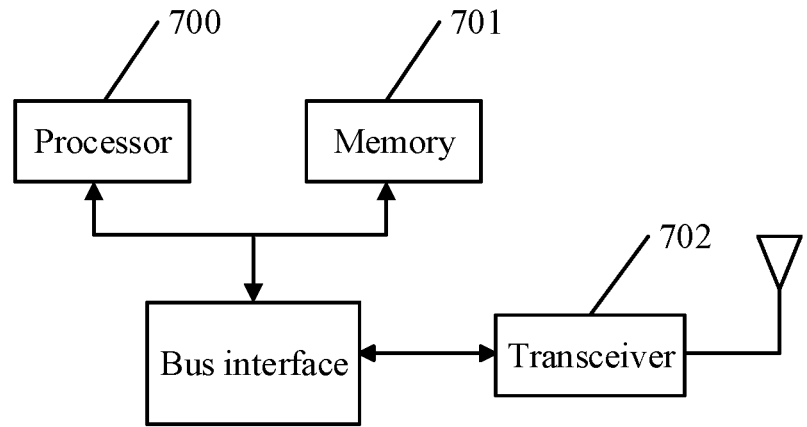
FIG. 7 is a schematic diagram of a remote device according to an embodiment of the present application.

As shown in FIG. 7, a remote device for feedback in an embodiment of the present application includes: a processor 700, a memory 701, a transceiver 702, and a bus interface.

The processor 700 is responsible for managing the bus architecture and general processing, and the memory 701 may store the data used by the processor 700 when performing the operations. The transceiver 703 is configured to receive and send the data under the control of the processor 700.

The bus architecture may include any numbers of interconnected buses and bridges, and specifically link various circuits of one or more processors represented by the processor 700 and the memory represented by the memory 701. The bus architecture may further link various other circuits such as peripheral device, voltage regulator and power management circuit, which are all well known in the art and thus will not be further described again herein. The bus interface provides an interface. The processor 700 is responsible for managing the bus architecture and general processing, and the memory 701 may store the data used by the processor 700 when performing the operations.

The procedure disclosed by the embodiment of the present application may be applied in the processor 700 or implemented by the processor 700. In the implementation process, each step of the signal processing flow may be completed by the integrated logic circuit of hardware in the processor 700 or the instruction in the form of software. The processor 700 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 701, and the processor 700 reads the information in the memory 701 and completes the steps of the signal processing flow in combination with its hardware.

In some embodiments, the processor 700 is configured to read the program in the memory 701 to:

determine channel quality information of a first sidelink and channel quality information of a second sidelink between the remote device and at least one candidate relay device; where the first sidelink is a sidelink for the candidate relay device to send information to the remote device, and the second sidelink is a sidelink for the candidate relay device to receive information from the remote device;

select a relay device to be used from the at least one candidate relay device according to the channel quality information of the first sidelink and the channel quality information of the second sidelink corresponding to the candidate relay device.

In one embodiment, the processor 700 is configured to:

for any candidate relay device: determine the channel quality information of the first sidelink according to a first measured signal sent by the candidate relay device.

In one embodiment, the processor 700 is configured to:

for any candidate relay device: send a second measured signal to the candidate relay device via the transceiver 702, and the candidate relay device determines the channel quality information of the second sidelink according to the second measured signal;

receive the channel quality information of the second sidelink determined according to the second measured signal and returned by the candidate relay device via the transceiver 702.

In one embodiment, the processor 700 is configured to:

for any candidate relay device: compare a parameter included in the channel quality information of the first sidelink and a parameter included in the channel quality information of the second sidelink corresponding to the candidate relay device with thresholds corresponding to parameters, to determine whether the candidate relay device is an alternative relay device;

select the relay device to be used from determined alternative relay devices.

In one embodiment, the processor 700 is configured to:

select the relay device to be used from at least two alternative relay devices according to parameters included in channel quality information of first sidelinks and parameters included in channel quality information of second sidelinks corresponding to the alternative relay devices if the at least two alternative relay devices are determined.

In one embodiment, the processor 700 is further configured to:

determine that a relay device to be used needs to be reselected according to channel quality information of a third sidelink and channel quality information of a fourth sidelink between the remote device and a currently used relay device;

where the third sidelink is a sidelink for the currently used relay device to send information to the remote device, and the fourth sidelink is a sidelink for the currently used relay device to receive information from the remote device.

In one embodiment, the processor 700 is configured to:

determine the channel quality information of the third sidelink according to a third measured signal sent by the currently used relay device.

In one embodiment, the processor 700 is configured to:

send a fourth measured signal to the currently used relay device via the transceiver 702, and the currently used relay device determines the channel quality information of the fourth sidelink according to the fourth measured signal;

receive the channel quality information of the fourth sidelink determined according to the fourth measured signal and returned by the currently used relay device via the transceiver 702.

In one embodiment, the processor 700 is configured to:

compare a parameter included in the channel quality information of the third sidelink and a parameter included in the channel quality information of the fourth sidelink corresponding to the currently used relay device with thresholds corresponding to parameters, and determine that the relay device to be used needs to be reselected according to a comparison result.

In one embodiment, the processor 700 is further configured to:

determine that a relay device to be used needs to be reselected after receiving indication information sent by a currently used relay device via the transceiver 702;

where the indication information is sent by the currently used relay device after determining that the remote device needs to reselect the relay device to be used.

In one embodiment, the thresholds corresponding to the parameters are pre-configured or configured by a network-side device for the remote device.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

Figure 8:
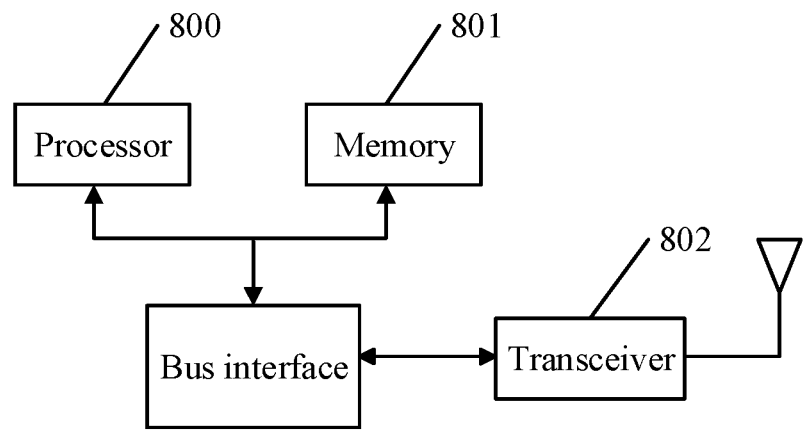
FIG. 8 is a schematic diagram of a candidate relay device according to an embodiment of the present application.

As shown in FIG. 8, a candidate relay device in an embodiment of the present application includes: a processor 800, a memory 801, a transceiver 802, and a bus interface.

The processor 800 is responsible for managing the bus architecture and general processing, and the memory 801 may store the data used by the processor 800 when performing the operations. The transceiver 802 is configured to receive and send the data under the control of the processor 800.

The bus architecture may include any numbers of interconnected buses and bridges, and specifically link various circuits of one or more processors represented by the processor 800 and the memory represented by the memory 801. The bus architecture may further link various other circuits such as peripheral device, voltage regulator and power management circuit, which are all well known in the art and thus will not be further described again herein. The bus interface provides an interface. The processor 800 is responsible for managing the bus architecture and general processing, and the memory 801 may store the data used by the processor 800 when performing the operations.

The procedure disclosed by the embodiment of the present application may be applied in the processor 800 or implemented by the processor 800. In the implementation process, each step of the signal processing flow may be completed by the integrated logic circuit of hardware in the processor 800 or the instruction in the form of software. The processor 800 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 801, and the processor 800 reads the information in the memory 801 and completes the steps of the signal processing flow in combination with its hardware.

In some embodiments, the processor 800 is configured to read the program in the memory 801 to:

send a first measured signal to a remote device via the transceiver 802, and the remote device determines channel quality information of a first sidelink between the remote device and a candidate relay device according to the first measured signal; and determine channel quality information of a second sidelink between the candidate relay device and the remote device according to a second measured signal sent by the remote device, and send the channel quality information of the second sidelink to the remote device via the transceiver 802, and the remote device selects a relay device to be used according to the channel quality information of the first sidelink and the channel quality information of the second sidelink corresponding to the candidate relay device;

where the first sidelink is a sidelink for the candidate relay device to send information to the remote device, and the second sidelink is a sidelink for the candidate relay device to receive information from the remote device.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

Figure 9:
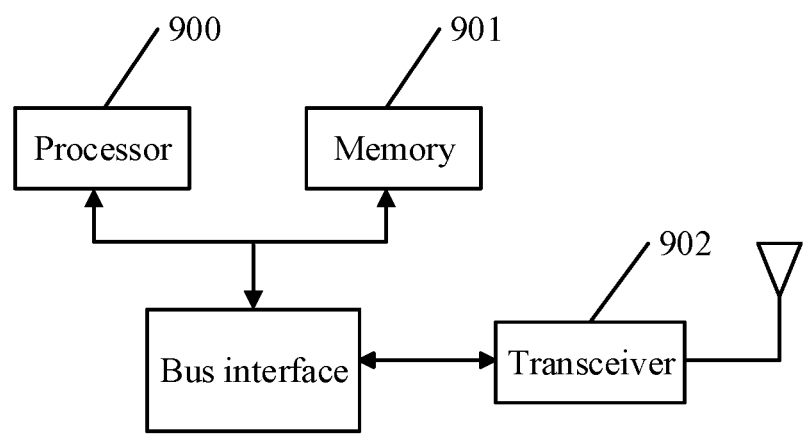
FIG. 9 is a schematic diagram of a relay device according to an embodiment of the present application.

As shown in FIG. 9, a relay device according to an embodiment of the present application includes: a processor 900, a memory 901, a transceiver 902, and a bus interface.

The processor 900 is responsible for managing the bus architecture and general processing, and the memory 901 may store the data used by the processor 900 when performing the operations. The transceiver 902 is configured to receive and send the data under the control of the processor 900.

The bus architecture may include any numbers of interconnected buses and bridges, and specifically link various circuits of one or more processors represented by the processor 900 and the memory represented by the memory 901. The bus architecture may further link various other circuits such as peripheral device, voltage regulator and power management circuit, which are all well known in the art and thus will not be further described again herein. The bus interface provides an interface. The processor 900 is responsible for managing the bus architecture and general processing, and the memory 901 may store the data used by the processor 900 when performing the operations.

The procedure disclosed by the embodiment of the present application may be applied in the processor 900 or implemented by the processor 900. In the implementation process, each step of the signal processing flow may be completed by the integrated logic circuit of hardware in the processor 900 or the instruction in the form of software. The processor 900 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 901, and the processor 900 reads the information in the memory 901 and completes the steps of the signal processing flow in combination with its hardware.

In some embodiments, the processor 900 is configured to read the program in the memory 901 to:

determine auxiliary information for assisting a remote device to determine whether to reselect a relay device to be used;

send the auxiliary information to the remote device via the transceiver 902, and the remote device determines that the relay device to be used needs to be reselected according to the auxiliary information and selects the relay device to be used according to channel quality information of a first sidelink and channel quality information of a second sidelink between the remote device and at least one candidate relay device;

where the first sidelink is a sidelink for the candidate relay device to send information to the remote device, and the second sidelink is a sidelink for the candidate relay device to receive information from the remote device.

In one embodiment, the auxiliary information includes a third measured signal and channel quality information of a fourth sidelink;

the processor 900 is configured to:

send the third measured signal to the remote device via the transceiver 902, and determine the channel quality information of the fourth sidelink according to a fourth measured signal sent by the remote device, and send the channel quality information of the fourth sidelink to the remote device via the transceiver 902, and the remote device determines channel quality information of a third sidelink according to the third measured signal and determines that the relay device to be used needs to be reselected according to the channel quality information of the third sidelink and the channel quality information of the fourth sidelink;

where the third sidelink is a sidelink for the relay device to send information to the remote device, and the fourth sidelink is a sidelink for the relay device to receive information from the remote device.

In one embodiment, the auxiliary information is indication information for indicating that the relay device to be used needs to be reselected;

the processor 900 is configured to:

generate the indication information for indicating that the relay device to be used needs to be reselected according to channel quality information of a third sidelink and channel quality information of a fourth sidelink between the relay device and the remote device; where the third sidelink is a sidelink for the relay device to send information to the remote device, and the fourth sidelink is a sidelink for the relay device to receive information from the remote device; or generate the indication information for indicating that the relay device to be used needs to be reselected according to quality of a cellular communication link between the relay device and a network side device; or generate the indication information for indicating that the relay device to be used needs to be reselected according to a working state of the relay device.

In one embodiment, the processor 900 is configured to:

send a third measured signal to the remote device via the transceiver 902, and the remote device determines the channel quality information of the third sidelink according to the third measured signal;

receive the channel quality information of the third sidelink determined according to the third measured signal and returned by the remote device via the transceiver 902.

In one embodiment, the processor 900 is configured to:

determine the channel quality information of the fourth sidelink according to a fourth measured signal sent by the remote device.

In one embodiment, the processor 900 is configured to:

compare a parameter included in the channel quality information of the third sidelink and a parameter included in the channel quality information of the fourth sidelink with thresholds corresponding to parameters, and generate the indication information according to a comparison result.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

Figure 10:
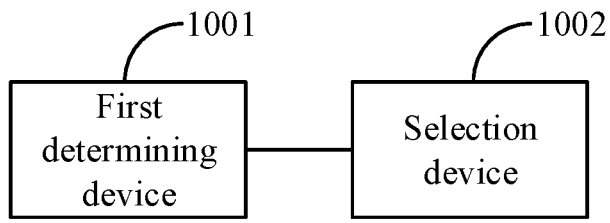
FIG. 10 is a schematic diagram of another remote device according to an embodiment of the present application.

As shown in FIG. 10, a remote device according to an embodiment of the present application includes:

a first determining device 1001 configured to determine channel quality information of a first sidelink and channel quality information of a second sidelink between the remote device and at least one candidate relay device; where the first sidelink is a sidelink for the candidate relay device to send information to the remote device, and the second sidelink is a sidelink for the candidate relay device to receive information from the remote device;

a selection device 1002 configured to select a relay device to be used from the at least one candidate relay device according to the channel quality information of the first sidelink and the channel quality information of the second sidelink corresponding to the candidate relay device.

In one embodiment, the first determining device 1001 is configured to:

for any candidate relay device: determine the channel quality information of the first sidelink according to a first measured signal sent by the candidate relay device.

In one embodiment, the first determining device 1001 is configured to:

for any candidate relay device: send a second measured signal to the candidate relay device, and the candidate relay device determines the channel quality information of the second sidelink according to the second measured signal;

receive the channel quality information of the second sidelink determined according to the second measured signal and returned by the candidate relay device.

In one embodiment, the selection device 1002 is configured to:

for any candidate relay device: compare a parameter included in the channel quality information of the first sidelink and a parameter included in the channel quality information of the second sidelink corresponding to the candidate relay device with thresholds corresponding to parameters, to determine whether the candidate relay device is an alternative relay device;

select the relay device to be used from determined alternative relay devices.

In one embodiment, the selection device 1002 is configured to:

select the relay device to be used from at least two alternative relay devices according to parameters included in channel quality information of first sidelinks and parameters included in channel quality information of second sidelinks corresponding to the alternative relay devices if the at least two alternative relay devices are determined.

In one embodiment, the remote device further includes:

a first triggering device configured to determine that a relay device to be used needs to be reselected according to channel quality information of a third sidelink and channel quality information of a fourth sidelink between the remote device and a currently used relay device;

where the third sidelink is a sidelink for the currently used relay device to send information to the remote device, and the fourth sidelink is a sidelink for the currently used relay device to receive information from the remote device.

In one embodiment, the first triggering device is configured to:

determine the channel quality information of the third sidelink according to a third measured signal sent by the currently used relay device.

In one embodiment, the first triggering device is configured to:

send a fourth measured signal to the currently used relay device, and the currently used relay device determines the channel quality information of the fourth sidelink according to the fourth measured signal;

receive the channel quality information of the fourth sidelink determined according to the fourth measured signal and returned by the currently used relay device.

In one embodiment, the first triggering device is configured to:

compare a parameter included in the channel quality information of the third sidelink and a parameter included in the channel quality information of the fourth sidelink corresponding to the currently used relay device with thresholds corresponding to parameters, and determine that the relay device to be used needs to be reselected according to a comparison result.

In one embodiment, the remote device further includes:

a second triggering device configured to determine that a relay device to be used needs to be reselected after receiving indication information sent by a currently used relay device;

where the indication information is sent by the currently used relay device after determining that the remote device needs to reselect the relay device to be used.

In one embodiment, the thresholds corresponding to the parameters are pre-configured or configured by a network-side device for the remote device.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

Figure 11:
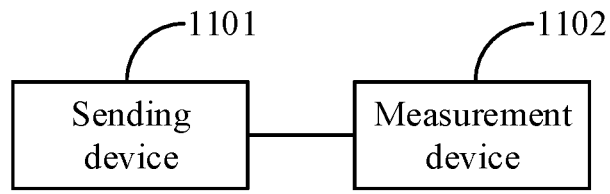
FIG. 11 is a schematic diagram of another candidate relay device according to an embodiment of the present application.

As shown in FIG. 11, a candidate relay device according to an embodiment of the present application includes:

a sending device 1101 configured to send a first measured signal to a remote device, and the remote device determines channel quality information of a first sidelink between the remote device and the candidate relay device according to the first measured signal; and a measurement device 1102 configured to determine channel quality information of a second sidelink between the candidate relay device and the remote device according to a second measured signal sent by the remote device, and send the channel quality information of the second sidelink to the remote device, and the remote device selects a relay device to be used according to the channel quality information of the first sidelink and the channel quality information of the second sidelink corresponding to the candidate relay device;

where the first sidelink is a sidelink for the candidate relay device to send information to the remote device, and the second sidelink is a sidelink for the candidate relay device to receive information from the remote device.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

Figure 12:
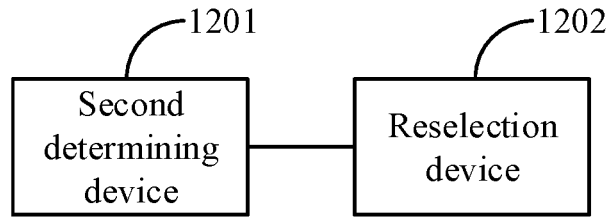
FIG. 12 is a schematic diagram of another relay device according to an embodiment of the present application.

As shown in FIG. 12, a relay device according to embodiment of the present application includes:

a second determining device 1201 configured to determine auxiliary information for assisting a remote device to determine whether to reselect a relay device to be used;

a reselection device 1202 configured to send the auxiliary information to the remote device, and the remote device determines that the relay device to be used needs to be reselected according to the auxiliary information and selects the relay device to be used according to channel quality information of a first sidelink and channel quality information of a second sidelink between the remote device and at least one candidate relay device;

where the first sidelink is a sidelink for the candidate relay device to send information to the remote device, and the second sidelink is a sidelink for the candidate relay device to receive information from the remote device.

In one embodiment, the auxiliary information includes a third measured signal and channel quality information of a fourth sidelink;

the second determining device 1201 is configured to:

send the third measured signal to the remote device, and determine the channel quality information of the fourth sidelink according to a fourth measured signal sent by the remote device, and send the channel quality information of the fourth sidelink to the remote device, and the remote device determines channel quality information of a third sidelink according to the third measured signal and determines that the relay device to be used needs to be reselected according to the channel quality information of the third sidelink and the channel quality information of the fourth sidelink;

where the third sidelink is a sidelink for the relay device to send information to the remote device, and the fourth sidelink is a sidelink for the relay device to receive information from the remote device.

In one embodiment, the auxiliary information is indication information for indicating that the relay device to be used needs to be reselected;

the second determining device 1201 is configured to:

generate the indication information for indicating that the relay device to be used needs to be reselected according to channel quality information of a third sidelink and channel quality information of a fourth sidelink between the relay device and the remote device; where the third sidelink is a sidelink for the relay device to send information to the remote device, and the fourth sidelink is a sidelink for the relay device to receive information from the remote device; or generate the indication information for indicating that the relay device to be used needs to be reselected according to quality of a cellular communication link between the relay device and a network side device; or generate the indication information for indicating that the relay device to be used needs to be reselected according to a working state of the relay device.

In one embodiment, the second determining device 1201 is configured to:

send a third measured signal to the remote device, and the remote device determines the channel quality information of the third sidelink according to the third measured signal;

receive the channel quality information of the third sidelink determined according to the third measured signal and returned by the remote device.

In one embodiment, the second determining device 1201 is configured to:

determine the channel quality information of the fourth sidelink according to a fourth measured signal sent by the remote device.

In one embodiment, the second determining device 1201 is configured to:

compare a parameter included in the channel quality information of the third sidelink and a parameter included in the channel quality information of the fourth sidelink with thresholds corresponding to parameters, and generate the indication information according to a comparison result.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

It should be noted that the division of functional devices in the relay device provided in the embodiments of the present application is only an example, and the function division modes shown in FIG. 11 and FIG. 12 are used to reflect the functions implemented by the relay device in different scenarios. The relay device provided in the embodiments of the present application may also have some or all of the functional devices of the relay device shown in FIG. 11 and FIG. 12.

An embodiment of the present application further provides a computer storable medium storing a computer program thereon, where the program, when executed by a processor, implements the steps of any one of the above methods.

Figure 13:
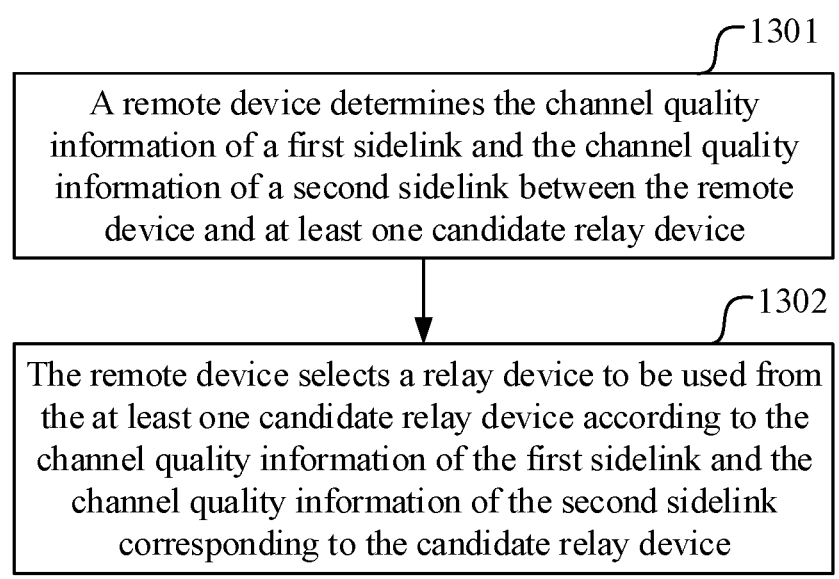
FIG. 13 is a flowchart of a relay device selection method according to an embodiment of the present application.

Based on the same inventive concept, an embodiment of the present application provides a relay device selection method. The method corresponds to the remote device in the system for selecting the relay device in the embodiment of the present application, and the principle of the method to solve the problem is similar to that of the system, so the implementations of the method can refer to the implementations of the system, and the repeated description thereof will be omitted here.

As shown in FIG. 13, a relay device selection method according to an embodiment of the present application includes:

Step 1301: a remote device determines the channel quality information of a first sidelink and the channel quality information of a second sidelink between the remote device and at least one candidate relay device;

Step 1302: the remote device selects a relay device to be used from the at least one candidate relay device according to the channel quality information of the first sidelink and the channel quality information of the second sidelink corresponding to the candidate relay device.

Here, the first sidelink is a sidelink for the candidate relay device to send information to the remote device, and the second sidelink is a sidelink for the candidate relay device to receive information from the remote device.

In one embodiment, the remote device determines the channel quality information of the first sidelink between the remote device and at least one candidate relay device in a following manner:

for any candidate relay device: the remote device determines the channel quality information of the first sidelink according to a first measured signal sent by the candidate relay device.

In one embodiment, the remote device determines the channel quality information of the second sidelink between the remote device and at least one candidate relay device in a following manner:

for any candidate relay device: the remote device sends a second measured signal to the candidate relay device, and the candidate relay device determines the channel quality information of the second sidelink according to the second measured signal;

the remote device receives the channel quality information of the second sidelink determined according to the second measured signal and returned by the candidate relay device.

In one embodiment, the step in which the remote device selects the relay device to be used from the at least one candidate relay device according to the channel quality information of the first sidelink and the channel quality information of the second sidelink corresponding to the candidate relay device, includes:

for any candidate relay device: comparing a parameter included in the channel quality information of the first sidelink and a parameter included in the channel quality information of the second sidelink corresponding to the candidate relay device with thresholds corresponding to parameters, to determine whether the candidate relay device is an alternative relay device;

selecting the relay device to be used from determined alternative relay devices.

In one embodiment, the selecting the relay device to be used from the determined candidate relay devices, includes:

selecting the relay device to be used from at least two alternative relay devices according to parameters included in channel quality information of first sidelinks and parameters included in channel quality information of second sidelinks corresponding to the alternative relay devices if the at least two alternative relay devices are determined.

In one embodiment, before the remote device determines the channel quality information of the first sidelink and the channel quality information of the second sidelink between the remote device and at least one candidate relay device, the method further includes:

the remote device determines that a relay device to be used needs to be reselected according to channel quality information of a third sidelink and channel quality information of a fourth sidelink between the remote device and a currently used relay device;

where the third sidelink is a sidelink for the currently used relay device to send information to the remote device, and the fourth sidelink is a sidelink for the currently used relay device to receive information from the remote device.

In one embodiment, the remote device determines the channel quality information of the third sidelink between the remote device and the currently used relay device in a following manner:

the remote device determines the channel quality information of the third sidelink according to a third measured signal sent by the currently used relay device.

In one embodiment, the remote device determines the channel quality information of the fourth sidelink between the remote device and the currently used relay device in a following manner:

the remote device sends a fourth measured signal to the currently used relay device, and the currently used relay device determines the channel quality information of the fourth sidelink according to the fourth measured signal;

the remote device receives the channel quality information of the fourth sidelink determined according to the fourth measured signal and returned by the currently used relay device.

In one embodiment, the step in which the remote device determines that the relay device to be used needs to be reselected according to the channel quality information of the third sidelink and the channel quality information of the fourth sidelink between the remote device and the currently used relay device, includes:

the remote device compares a parameter included in the channel quality information of the third sidelink and a parameter included in the channel quality information of the fourth sidelink corresponding to the currently used relay device with thresholds corresponding to parameters, and determines that the relay device to be used needs to be reselected according to a comparison result.

In one embodiment, before the remote device determines the channel quality information of the first sidelink and the channel quality information of the second sidelink between the remote device and at least one candidate relay device, the method further includes:

the remote device determines that a relay device to be used needs to be reselected after receiving indication information sent by a currently used relay device;

where the indication information is sent by the currently used relay device after determining that the remote device needs to reselect the relay device to be used.

In one embodiment, the thresholds corresponding to the parameters are pre-configured or configured by a network-side device for the remote device.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

Based on the same inventive concept, an embodiment of the present application provides a relay device selection method. The method corresponds to any candidate relay device in the system for selecting the relay device in the embodiment of the present application, and the principle of the method to solve the problem is similar to that of the system, so the implementations of the method can refer to the implementations of the system, and the repeated description thereof will be omitted here.

Figure 14:
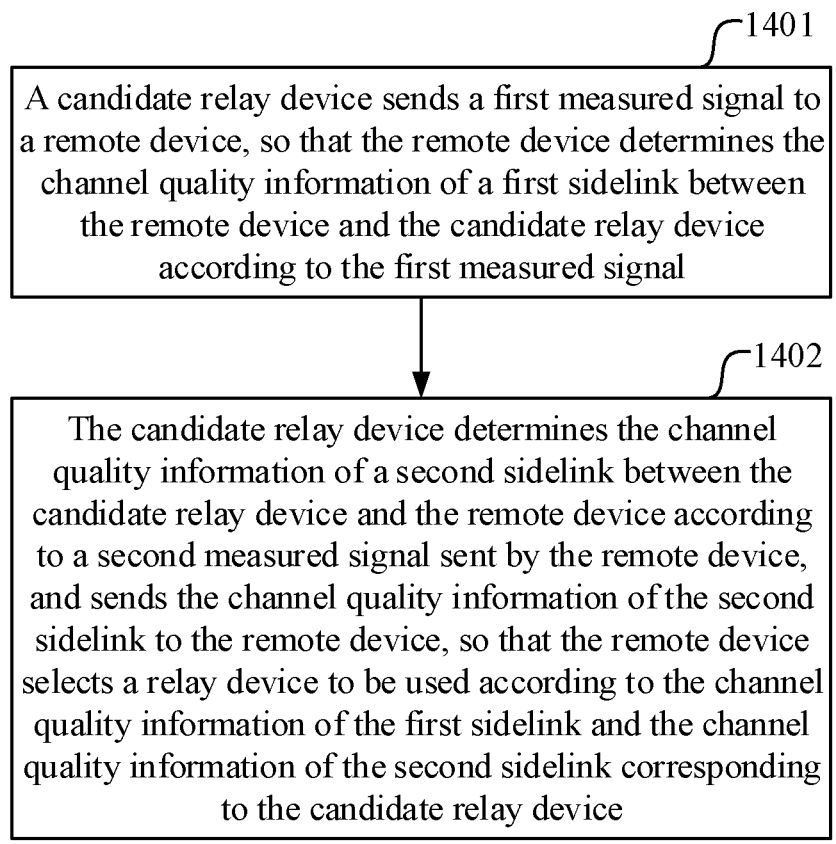
FIG. 14 is a flowchart of another relay device selection method according to an embodiment of the present application.

As shown in FIG. 14, a relay device selection method according to an embodiment of the present application includes:

Step 1401: a candidate relay device sends a first measured signal to a remote device, and the remote device determines the channel quality information of a first sidelink between the remote device and the candidate relay device according to the first measured signal;

Step 1402: the candidate relay device determines the channel quality information of a second sidelink between the candidate relay device and the remote device according to a second measured signal sent by the remote device, and sends the channel quality information of the second sidelink to the remote device, and the remote device selects a relay device to be used according to the channel quality information of the first sidelink and the channel quality information of the second sidelink corresponding to the candidate relay device.

Here, the first sidelink is a sidelink for the candidate relay device to send information to the remote device, and the second sidelink is a sidelink for the candidate relay device to receive information from the remote device.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

Figure 15:
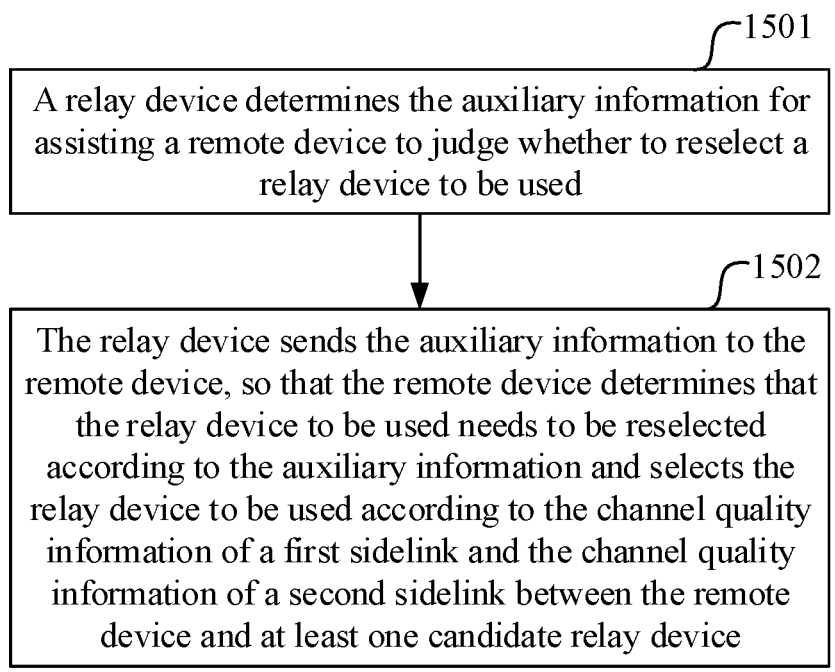
FIG. 15 is a flowchart of another relay device selection method according to an embodiment of the present application.

As shown in FIG. 15, a relay device selection method according to an embodiment of the present application includes:

Step 1501: a relay device determines the auxiliary information for assisting a remote device to determine whether to reselect a relay device to be used;

Step 1502: the relay device sends the auxiliary information to the remote device, and the remote device determines that the relay device to be used needs to be reselected according to the auxiliary information and selects the relay device to be used according to the channel quality information of a first sidelink and the channel quality information of a second sidelink between the remote device and at least one candidate relay device.

Here, the first sidelink is a sidelink for the candidate relay device to send information to the remote device, and the second sidelink is a sidelink for the candidate relay device to receive information from the remote device.

In one embodiment, the auxiliary information includes a third measured signal and channel quality information of a fourth sidelink;

the step in which the relay device sends the auxiliary information to the remote device, includes:

the relay device sends the third measured signal to the remote device, and the relay device determines the channel quality information of the fourth sidelink according to a fourth measured signal sent by the remote device, and sends the channel quality information of the fourth sidelink to the remote device, and the remote device determines channel quality information of a third sidelink according to the third measured signal and determines that the relay device to be used needs to be reselected according to the channel quality information of the third sidelink and the channel quality information of the fourth sidelink;

where the third sidelink is a sidelink for the relay device to send information to the remote device, and the fourth sidelink is a sidelink for the relay device to receive information from the remote device.

In one embodiment, the auxiliary information is indication information for indicating that the relay device to be used needs to be reselected;

the step in which the relay device determines the auxiliary information for assisting the remote device to determine whether to reselect the relay device to be used, includes:

the relay device generates the indication information for indicating that the relay device to be used needs to be reselected according to channel quality information of a third sidelink and channel quality information of a fourth sidelink between the relay device and the remote device;

where the third sidelink is a sidelink for the relay device to send information to the remote device, and the fourth sidelink is a sidelink for the relay device to receive information from the remote device; or the relay device generates the indication information for indicating that the relay device to be used needs to be reselected according to quality of a cellular communication link between the relay device and a network side device; or the relay device generates the indication information for indicating that the relay device to be used needs to be reselected according to a working state of the relay device.

In one embodiment, the relay device determines the channel quality information of the third sidelink in a following manner:

the relay device sends a third measured signal to the remote device, and the remote device determines the channel quality information of the third sidelink according to the third measured signal;

the relay device receives the channel quality information of the third sidelink determined according to the third measured signal and returned by the remote device.

In one embodiment, the relay device determines the channel quality information of the fourth sidelink in a following manner:

the relay device determines the channel quality information of the fourth sidelink according to a fourth measured signal sent by the remote device.

In one embodiment, the step in which the relay device generates the indication information for indicating that the relay device to be used needs to be reselected according to the channel quality information of the third sidelink and the channel quality information of the fourth sidelink between the relay device and the remote device, includes:

the relay device compares a parameter included in the channel quality information of the third sidelink and a parameter included in the channel quality information of the fourth sidelink with thresholds corresponding to parameters, and generates the indication information according to a comparison result.

In one embodiment, the channel quality information includes some or all of:

Channel State Information (CSI), Channel Quality Indicator (CQI), Rand Indication (RI), Signal to Interference plus Noise Ratio (SINR), Reference Signal Receiving Power (RSRP), Reference Signal Receiving Quality (RSRQ), Received Signal Strength Indication (RSSI), block error rate, bit error rate, Hybrid Automatic Repeat Request (HARQ) information.

It The embodiments of the present application can provide methods, systems and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A relay device selection method, comprises:
    determining, by a remote device, channel quality information of a first sidelink and channel quality information of a second sidelink between the remote device and at least one candidate relay device; wherein the first sidelink is a sidelink for the candidate relay device to send information to the remote device, and the second sidelink is a sidelink for the candidate relay device to receive information from the remote device;
    selecting, by the remote device, a relay device to be used from the at least one candidate relay device according to the channel quality information of the first sidelink and the channel quality information of the second sidelink corresponding to the candidate relay device.

2. The method of claim 1, wherein the determining, by the remote device, the channel quality information of the first sidelink between the remote device and at least one candidate relay device in a following manner:
    for any candidate relay device: determining, by the remote device, the channel quality information of the first sidelink according to a first measured signal sent by the candidate relay device;
    the determining, by the remote device, the channel quality information of the second sidelink between the remote device and at least one candidate relay device in a following manner:
    for any candidate relay device: sending, by the remote device, a second measured signal to the candidate relay device, so that the candidate relay device determines the channel quality information of the second sidelink according to the second measured signal;
    receiving, by the remote device, the channel quality information of the second sidelink determined according to the second measured signal and returned by the candidate relay device;
    wherein the selecting, by the remote device, the relay device to be used from the at least one candidate relay device according to the channel quality information of the first sidelink and the channel quality information of the second sidelink corresponding to the candidate relay device, comprises:
    for any candidate relay device: comparing a parameter included in the channel quality information of the first sidelink and a parameter included in the channel quality information of the second sidelink corresponding to the candidate relay device with thresholds corresponding to parameters, to judge whether the candidate relay device is an alternative relay device;
    selecting the relay device to be used from determined alternative relay devices.

3. The method of claim 1, wherein the selecting the relay device to be used from the determined candidate relay devices, comprises:
    selecting the relay device to be used from at least two alternative relay devices according to parameters included in channel quality information of first sidelinks and parameters included in channel quality information of second sidelinks corresponding to the alternative relay devices in response to the at least two alternative relay devices being determined.

4. The method of claim 1, wherein before the determining, by the remote device, the channel quality information of the first sidelink and the channel quality information of the second sidelink between the remote device and at least one candidate relay device, the method further comprises:
    determining, by the remote device, to reselect a relay device to be used according to channel quality information of a third sidelink and channel quality information of a fourth sidelink between the remote device and a currently used relay device;
    wherein the third sidelink is a sidelink for the currently used relay device to send information to the remote device, and the fourth sidelink is a sidelink for the currently used relay device to receive information from the remote device.

5. The method of claim 4, wherein the determining, by the remote device, the channel quality information of the third sidelink between the remote device and the currently used relay device in a following manner:
    determining, by the remote device, the channel quality information of the third sidelink according to a third measured signal sent by the currently used relay device;

the determining, by the remote device, the channel quality information of the fourth sidelink between the remote device and the currently used relay device in a following manner:
sending, by the remote device, a fourth measured signal to the currently used relay device, so that the currently used relay device determines the channel quality information of the fourth sidelink according to the fourth measured signal;
receiving, by the remote device, the channel quality information of the fourth sidelink determined according to the fourth measured signal and returned by the currently used relay device;
wherein the determining, by the remote device, to reselect the relay device to be used according to the channel quality information of the third sidelink and the channel quality information of the fourth sidelink between the remote device and the currently used relay device, comprises:
comparing, by the remote device, a parameter included in the channel quality information of the third sidelink and a parameter included in the channel quality information of the fourth sidelink corresponding to the currently used relay device with thresholds corresponding to parameters, and determining that the relay device to be used needs to be reselected according to a comparison result.

6. The method of claim 1, wherein before the determining, by the remote device, the channel quality information of the first sidelink and the channel quality information of the second sidelink between the remote device and at least one candidate relay device, the method further comprises:
determining, by the remote device, to reselect a relay device to be used after receiving indication information sent by a currently used relay device;
wherein the indication information is sent by the currently used relay device after determining that the remote device needs to reselect the relay device to be used.

7. The method of claim 1, wherein the thresholds corresponding to the parameters are pre-configured or configured by a network-side device for the remote device.

8. The method of claim 1, wherein the channel quality information comprises some or all of:
Channel State Information, CSI; Channel Quality Indicator, CQI; Rand Indication, RI; Signal to Interference plus Noise Ratio, SINR; Reference Signal Receiving Power, RSRP; Reference Signal Receiving Quality, RSRQ; Received Signal Strength Indication, RSSI; block error rate; bit error rate; Hybrid Automatic Repeat Request, HARQ, information.

9. A remote device, comprises a processor, a memory and a transceiver;
wherein the processor is configured to read programs in the memory to implement the method of claim 1.

10. The remote device of claim 9, wherein the processor is configured to determine the channel quality information of the first sidelink between the remote device and at least one candidate relay device in a following manner:
for any candidate relay device: determine the channel quality information of the first sidelink according to a first measured signal sent by the candidate relay device;
the processor is configured to determine the channel quality information of the second sidelink between the remote device and at least one candidate relay device in a following manner:
for any candidate relay device: send a second measured signal to the candidate relay device, so that the candidate relay device determines the channel quality information of the second sidelink according to the second measured signal; and receive the channel quality information of the second sidelink determined according to the second measured signal and returned by the candidate relay device;
the processor is configured to:
for any candidate relay device: compare a parameter included in the channel quality information of the first sidelink and a parameter included in the channel quality information of the second sidelink corresponding to the candidate relay device with thresholds corresponding to parameters, to judge whether the candidate relay device is an alternative relay device;
select the relay device to be used from determined alternative relay devices.

11. The remote device of claim 10, wherein the processor is configured to:
select the relay device to be used from at least two alternative relay devices according to parameters included in channel quality information of first sidelinks and parameters included in channel quality information of second sidelinks corresponding to the alternative relay devices in response to the at least two alternative relay devices being determined.

12. The remote device of claim 10, wherein the thresholds corresponding to the parameters are pre-configured or configured by a network-side device for the remote device.

13. The remote device of claim 9, wherein the processor is further configured to:
determine that a relay device to be used needs to be reselected according to channel quality information of a third sidelink and channel quality information of a fourth sidelink between the remote device and a currently used relay device;
wherein the third sidelink is a sidelink for the currently used relay device to send information to the remote device, and the fourth sidelink is a sidelink for the currently used relay device to receive information from the remote device.

14. The remote device of claim 13, wherein the processor is configured to: determine the channel quality information of the third sidelink between the remote device and the currently used relay device in a following manner:
determine the channel quality information of the third sidelink according to a third measured signal sent by the currently used relay device;
the processor is
configured to: determine the channel quality information of the fourth sidelink between the remote device and the currently used relay device in a following manner:
send a fourth measured signal to the currently used relay device, so that the currently used relay device determines the channel quality information of the fourth sidelink according to the fourth measured signal; and receive the channel quality information of the fourth sidelink determined according to the fourth measured signal and returned by the currently used relay device;
the processor is configured to:
compare a parameter included in the channel quality information of the third sidelink and a parameter included in the channel quality information of the fourth sidelink corresponding to the currently used relay device with thresholds corresponding to parameters, and determine that the relay device to be used needs to be reselected according to a comparison result.

15. The remote device of claim 9, wherein the processor is further configured to:
   determine that a relay device to be used needs to be reselected after receiving indication information sent by a currently used relay device via the transceiver;
   wherein the indication information is sent by the currently used relay device after determining that the remote device needs to reselect the relay device to be used.

16. The remote device of claim 9, wherein the channel quality information comprises some or all of:
   Channel State Information, CSI; Channel Quality Indicator, CQI; Rand Indication, RI; Signal to Interference plus Noise Ratio, SINR; Reference Signal Receiving Power, RSRP; Reference Signal Receiving Quality, RSRQ; Received Signal Strength Indication, RSSI; block error rate; bit error rate; Hybrid Automatic Repeat Request, HARQ, information.

* * * * *